US012363028B2

(12) United States Patent
Feng et al.

(10) Patent No.: US 12,363,028 B2
(45) Date of Patent: Jul. 15, 2025

(54) GEOGRAPHIC ROUTING

(71) Applicant: Intel Corporation, Santa Clara, CA (US)

(72) Inventors: Hao Feng, Hillsboro, OR (US); Srikathyayani Srikanteswara, Portland, OR (US); Yi Zhang, Portland, OR (US); Satish Chandra Jha, Portland, OR (US); S M Iftekharul Alam, Hillsboro, OR (US); Marcin Spoczynski, Leixlip (IE); Alexander Bachmutsky, Sunnyvale, CA (US); Nageen Himayat, Fremont, CA (US); Ned M. Smith, Beaverton, OR (US); Kshitij Arun Doshi, Tempe, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 17/484,102

(22) Filed: Sep. 24, 2021

(65) Prior Publication Data

US 2022/0014462 A1 Jan. 13, 2022

(51) Int. Cl.
*H04L 45/12* (2022.01)
*H04W 4/46* (2018.01)

(52) U.S. Cl.
CPC ............ *H04L 45/126* (2013.01); *H04W 4/46* (2018.02)

(58) Field of Classification Search
CPC ..... H04L 45/126; H04L 45/121; H04L 47/28; H04W 4/46; H04W 4/021; H04W 40/026; H04W 40/20; H04W 40/22
See application file for complete search history.

(56) References Cited

U.S. PATENT DOCUMENTS

| 6,202,023 B1* | 3/2001 | Hancock | H04L 67/30 |
| | | | 707/E17.11 |
| 9,036,509 B1* | 5/2015 | Addepalli | H04L 69/18 |
| | | | 701/1 |
| 2014/0226579 A1* | 8/2014 | Roy | H04L 45/72 |
| | | | 370/329 |

FOREIGN PATENT DOCUMENTS

CN 115866705 3/2023

OTHER PUBLICATIONS

Antonio, Capone "Receiver Oriented Trajectory Based Forwarding", SAT 2015 18th International Conference, (Jan. 1, 2006), 21-33 (Year: 2006).*

(Continued)

*Primary Examiner* — Chae S Lee
(74) *Attorney, Agent, or Firm* — Schwegman Lundberg & Woessner, P.A.

(57) ABSTRACT

System and techniques for geographic routing are described herein. A node receives a data packet that includes map data, a sequence of geographic areas to a requestor, and a target geographic area. The node may then determine that it is within the target geographic area and start a transmit timer based on a next-hop geographic area. Here, the next-hop geographic area is determined from the sequence of geographic areas in the data packet. The node may then counts how many other nodes from the geographic area sent data packets while the transmit timer is running. When the transmit timer expires, the node may transmit a modified data packet when the number of data packets is less than a predefined threshold. Here, the modified data packet is the data packet updated to include local map data and the next-hop geographic area.

28 Claims, 19 Drawing Sheets

(56) References Cited

OTHER PUBLICATIONS

"European Application Serial No. 22189483.5, Extended European Search Report Report mailed Nov. 3, 2022", 10 pgs.

"European Application Serial No. 22189483.5, Response filed Sep. 26, 2023 to Office Action mailed Apr. 3, 2023", 20 pgs.

"European Application Serial No. 22189483.5, Communication Pursuant to Article 94(3) EPC mailed Jan. 25, 2024", 8 pgs.

Antonio, Capone, "Receiver Oriented Trajectory Based Forwarding", SAT 2015 18th International Conference, (Jan. 1, 2006), 21-33.

Giruka, "A self-healing On-demand Geographic Path Routing Protocol for mobile ad-hoc networks", Ad Hoc Networks, Elsevier, Amsterdam, NL, vol. 5, No. 7, (May 30, 2007), 1113-1128.

\* cited by examiner

GEOGRAPHIC ROUTING

TECHNICAL FIELD

Embodiments described herein generally relate to computer networking and more specifically to geographic routing in a network.

BACKGROUND

Computer networks transmit data from machine to machine using a variety of physical media (e.g., wired, light, radio frequency (RF), etc.). Circuit switched networks generally establish a circuit between a sending device and a receiving device. Modern networks are generally packet switched, in which data is encapsulated in a packet and sent through the network. Often there are several different routes for the packet to take as it traverses the network. The techniques for managing the routes for a variety of purposes—such as reliability, throughput, efficiency, etc.—are generally called routing.

Vehicles, such as cars, drones, planes, etc. more often include radio equipment to participate in computer networks. Generally, vehicles use RF media to transmit and receive packetized data. Vehicles may communicate with each other directly, or with infrastructure—such as cellular base stations, buildings, road side units (RSUs), etc.—to participate in ad-hoc networks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

There are some situations in which traditional routing techniques may experience problems. For example, emergency response systems generally need real-time data to, for example, detect disasters or unexpected situations. This data acquisition generally triggers real-time networking with local resources, such as vehicle or telecommunications operators. It is generally important that on-demand discovery of resources—which may include live map creation—is enabled by the mobile network units, such as vehicles. Resource discovery may involve recruiting devices to provide computation platforms, services, or data in addition to identification of physical services. Here, physical services may include such things as hospitals, police stations, groceries, fuel stations, or other services.

When the resource information is beyond the radio range of the requestor (e.g., an emergency vehicle), the vehicle network will be used to route a request. This is complicated, however, because vehicles will be moving through various areas. Discovering resources, or resource providers, and maintaining connectivity to them may be challenging because the communication infrastructure may vary significantly along different routes or areas. For example, areas hit by a disaster, rural, underpopulated, or underdeveloped areas (e.g., communities) lack cellular infrastructure as compared to urban areas.

Figure 15:
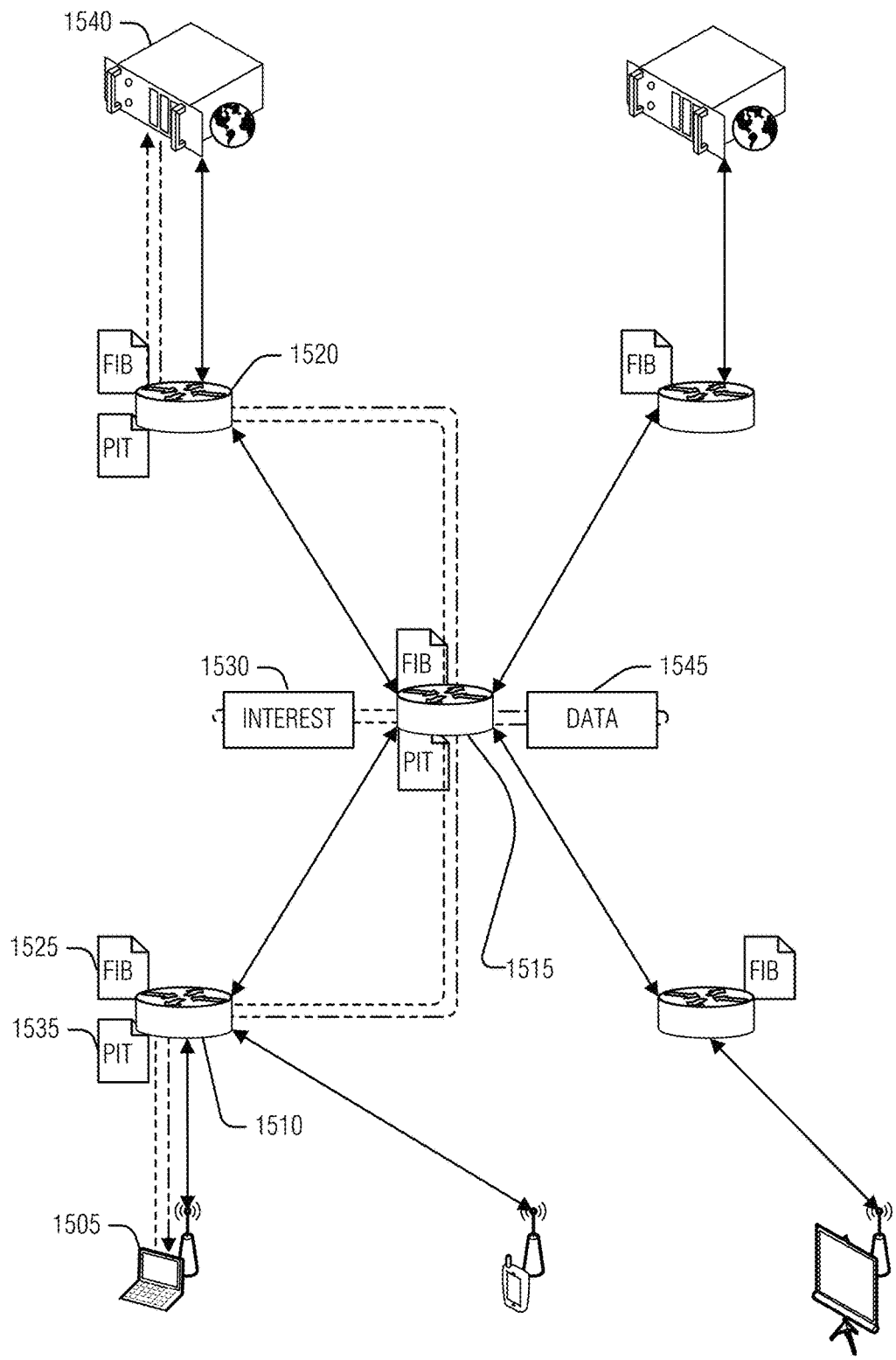
FIG. 15 illustrates an example information centric network (ICN), according to an embodiment.

There have been a number of vehicle routing frameworks. For example, E-CHANET is an on-demand routing protocol with some extensions for wireless information centric network (ICN) based networks—an example of an ICN is illustrated in FIG. 15—where both interest and data packets are broadcast. Because of the broadcasting, E-CHANET does not need to discover or maintain remote faces (e.g., interfaces) of neighbor nodes for forwarding either the interest or the data packet (e.g., a data packet doesn't need to follow the return path of interest as in traditional ICN). Because of the great traffic this approach may generate, a forwarder may wait a predefined time before forwarding an interest or data packet. If it receives (e.g., hears) the packet being transmitted from another node during this time, it discards the packet.

In some geographic location (e.g., geolocation) dependent networking protocols, packets may be delivered to a destination identified by its geographical location within a network. In an example, each intermediate node decides whether to forward the packet by comparing the node's geolocation with the destination's geolocation. For example, Greedy Perimeter Stateless Routing (GPSR) is a distributed networking protocol along these lines. Here, a forwarding node chooses the neighbor node nearest to the destination as the receiver of the forwarding stage and forwards the packet to the selected node by unicast. Content Connectivity and Location-Aware Forwarding (CCLF) is the networking protocol designed in the context of ICNs. Under CCLF, each intermediate node executes the forwarding by broadcast. The forwarding decision is made by calculating specific score values based on the node's geolocation with respect to the geolocations of the forwarder in the previous hop and the destination, as well as its empirically estimated multi-hop connectivity to the destination.

There are several issues with these approaches, however, for example, although a broadcast (e.g., flooding strategy) may employ aggregation (e.g., interest aggregation) to mitigate the flood, it often results in non-negligible interferences in wireless networks with limited frequency-time resources. The GPSR routing technique tends to choose the farthest neighbor node toward the destination, the one nearest to the destination among neighbor nodes, as the next hop forwarder resulting in lower forwarding reliability. In addition, unicast transmission reduces efficiency for resource discovery in GPSR.

To address these issues, an efficient geographic area (GA) assisted (GAA) routing technique is described herein. The GAA routing technique is a multi-hop packet routing mechanism for resource discovery and live map creation in highly dynamic peer-to-peer networks with intermittent connectivity to infrastructure (e.g., cellular base stations, RSUs, or other fixed radio resources in an edge). The physical environment is divided into geographical areas sized to enable a typical broadcast from a device in one GA to reach devices in a neighbor GA. GAA uses a broadcast forwarding mechanism for interest packets, however, unlike traditional ICN, the interest packet is modified upon each forwarding to include the current GA, creating a sequence of GAs between a requestor and ultimate recipient. When interest forwarding is complete—either because a hop-count or other metric has been reached or a requested resource is found—the data packet follows the reversed sequence of GAs in the interest packet back to the requestor. Here, data packets are broadcast or multicast for forwarding but indicate a target GA (e.g., GA-constrained multicast), enabling nodes in other GAs to ignore the broadcast or multicast. During transit, the interest and data packets may collect capability information from each GA, enabling each recipient of these packets to update its local map data, creating a live map. GA broadcasting and data capture within the interest and data packets enables efficient routing in dynamic vehicle networks because vehicles (or other nodes) need simply ascertain in what GA they reside when a packet is received. Thus, whatever authorized vehicles are in a given GA may respond to a request to that GA.

GAA may be applied to some rural, underpopulated, underdeveloped communities or areas experiencing disasters with limited or no wireless infrastructure. GAA enables fast discovery of targeted resources along with live map creation or updates with little or no overhead. Additional examples and details are provided below.

Figure 1:
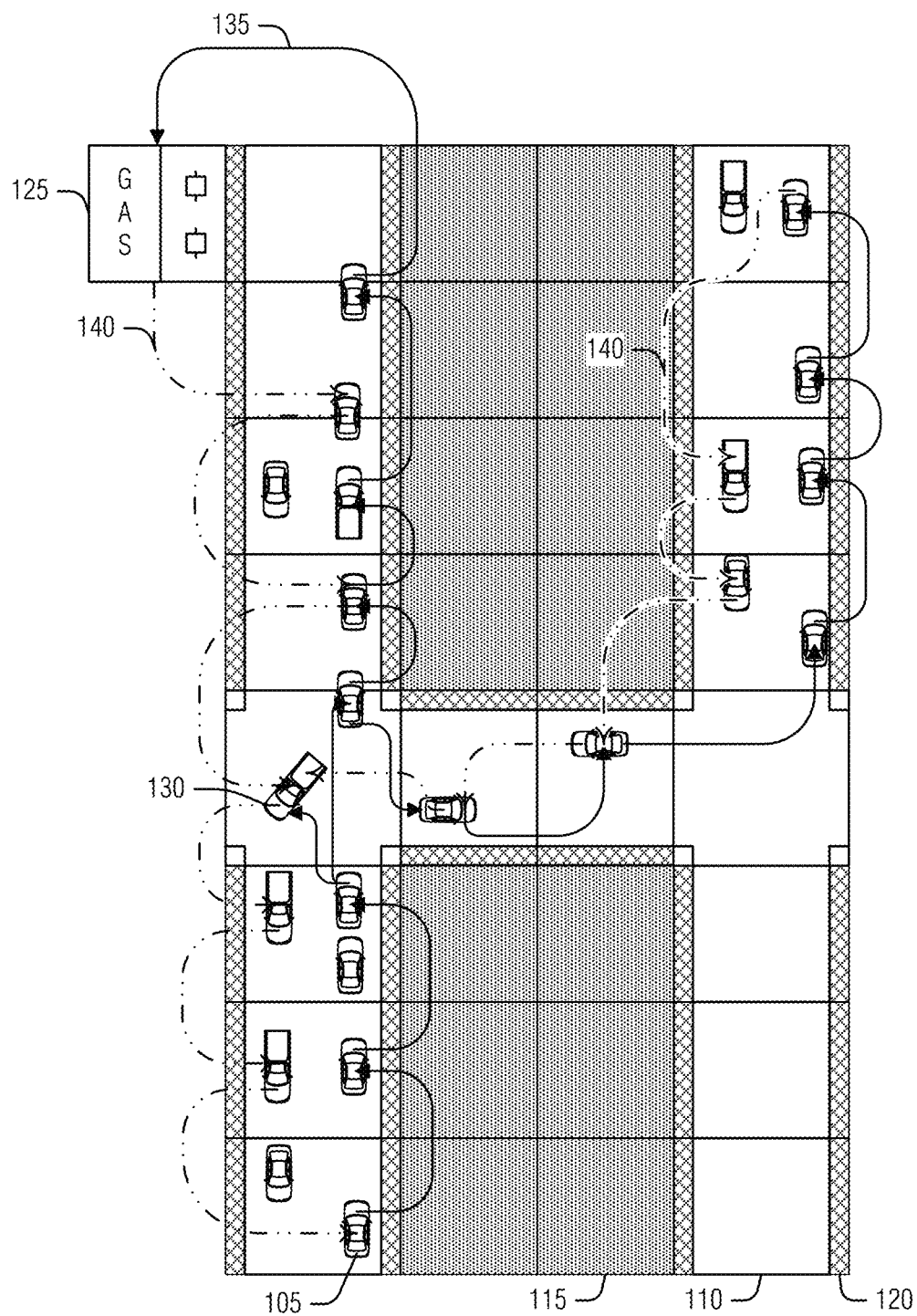
FIG. 1 is a block diagram of an example of an environment including a system for geographic routing, according to an embodiment.

FIG. 1 illustrates an example of an environment where GAA routing may be applied, according to an embodiment. There are various GAs illustrated, such as road GA 110, border GA 120, or building GA 115. As illustrated the consumer 105 sends an interest packet (the path of which is denoted by the solid lines between nodes such as path 135) to discover the resource 125 (a fuel service station). As the interest traverses each GA, one or more vehicles in the GA forward the interest packet on to a neighbor GA). The return path 140 illustrates data packet hops returning towards the consumer 105.

Each node, such as the consumer 105, the vehicle 130, or the resource 125, are computing devices that include processing circuitry (e.g., preconfigured or configured through software) and radios used to implement GAA. In an example, node includes a positioning system (e.g., satellite navigation system, geo-coding, etc.) to locate the node in the environment (e.g., in a particular GA) at any given time. In an example, the node includes memory to store a live map version that is divided by the GAs. This live map may be used to track resources for GAs traversed by the node. The live map may be used to augment information in either interest or data packets and may be updated by information in the interest or data packets. In an example, GAA may reside at a middleware, facility, or network layer in various coexisting radio access technologies (RATs) with different average radio ranges.

Within the context illustrated in FIG. 1, the discovery and live map creation procedure is a round-trip routing procedure involving an interest phase and a response (e.g., data packet) phase. The response phase may involve to distinct procedures depending on whether the data packet includes a target result (e.g., a positive indication that the resource 125 was found) or the data packet does not include the target result. The interest delivery phase encompasses the generation of the interest packet until the interest packet reaches the targeted resource 125 or a termination metric (e.g., maximum number of hops, maximum elapsed time)—specified in the interest packet or communicated to the nodes during a configuration—is reached. In an example, at each hop, the interest packet gathers the information of the passing GA—the interest packet is modified by nodes in the GA to include this information—that may be used for live map creation or updates. In an example, this information includes compute resources, data resources, storage resources, artificial intelligence (AI) capabilities, sensing capabilities, or physical resources (e.g., human or mechanical resources or services). In an example, a forwarding node is configured to provide estimates of occupancy level within its GA based on, for example, sensing or AI capabilities. The information augments (e.g., modifies) the interest packet during routing and is transferred to the responsive data packet (e.g., created by the resource 125) that is sent back to the consumer 105.

The consumer 105 (e.g., a user or device) initiates the discovery procedure by multicasting an interest packet carrying queries for the targeted resource 125 to the nodes in its neighbor GAs. In an example, the queries may specify a request for specialized computing (e.g., accelerators, encryption, etc.), security, communication capabilities, or an agent providing physical resources, such as a rescue station, pharmacy, etc. In an example, the query may be implemented as a finite length bitfield in the interest packet. Such a format may be readily processed (e.g., inspected, forwarded, or responded to) by a nearest path neighbor able to offer the requested resource for defined spans of time. For example, the consumer 105 may request whether there is any capability in the network to perform a search-and-estimate operation that uses both high-speed connectivity to a regional data center and local acceleration to customize the results with the consumer's continuously changing location. In an example, other aspects of the query (e.g., a remainder) may include specifics (e.g., parameters, operational constraints, etc.) of the search-and-estimate operation.

In an example, at each hop, one or multiple nodes having received the interest packet within a GA are selected to forward the packet by multicasting to the nodes in their neighbor GAs, except the one in the traveled GA of the previous hop (see FIG. 1). In an example, there is a predefined number of forwarders to enable redundancy. In an example, the predefined number of forwarders is three or less. In an example, the predefined number of forwarders may be included in the interest packet, any node having received the interest packet being able to read the number. If the consumer 105 or any forwarding node, has preliminary information on the direction of the resource 125, the device distribution within a neighbor GA (e.g., GA directly adjacent to the GA), or channel conditions to nodes located in neighbor GAs, the consumer 105 or forwarder may identify a subset of neighbor GAs eligible to receive and forward the interest packet according to the preliminary information. In an example, to limit the discovery range, a maximum hop count value may be included into the interest packet (e.g., in the query bitfield) for each forwarding node to refer. The interest delivery lasts until the targeted resource 125 is found; the termination metric (e.g., the maximum hop count is reached), or a "dead end" is reached. Here, dead end refers to an inability to transmit the interest to a GA that has not yet been visited.

It is possible that a route is disconnected. For example, a node moves through an area with no nodes in neighbor GAs, resulting in a "dead end" (e.g., vacant GA), and a node moves through these areas while carrying the interest packet and resumes the interest packet delivery afterwards. In this case, a forwarding node of the data packet may recalculate (e.g., update) the data-GA-path (the GA sequence to travel through) that bypasses the vacant GA by referring a local live map (e.g., stored on the node), or moves through the vacant GA carrying the data packet, adding the list of vacant GAs traversed to the interest packet. Once the node moves to a new place, possibly across GAs, and detects nodes in the neighborhood, it can resume the discovery procedure.

While the interest packet is being forwarded, in an example, the hop count, record of traveled GA at each hop, are updated in the interest packet. In an example, the forwarding node also writes its information about its current GA (e.g., locally collected information that may be obtained through intra-GA messaging). Again, this information is useful for live map creation or updates.

A forwarding node may receive multiple versions of an interest packet from different directions. In an example, if the arrival time difference of the received interest packets—identifying the same query for the resource 125—are within a time window, the forwarding node aggregates the live map information carried by the multiple versions of the interest packet before forwarding a single interest packet. If the versions of the interest packet arrive outside of the time window, the forwarding node may discard later-arriving interest packets, for example, after reading their carried live map information. In an example, the forwarding node maintains a record of arrival times for the later-arriving interest packets.

Figure 5:
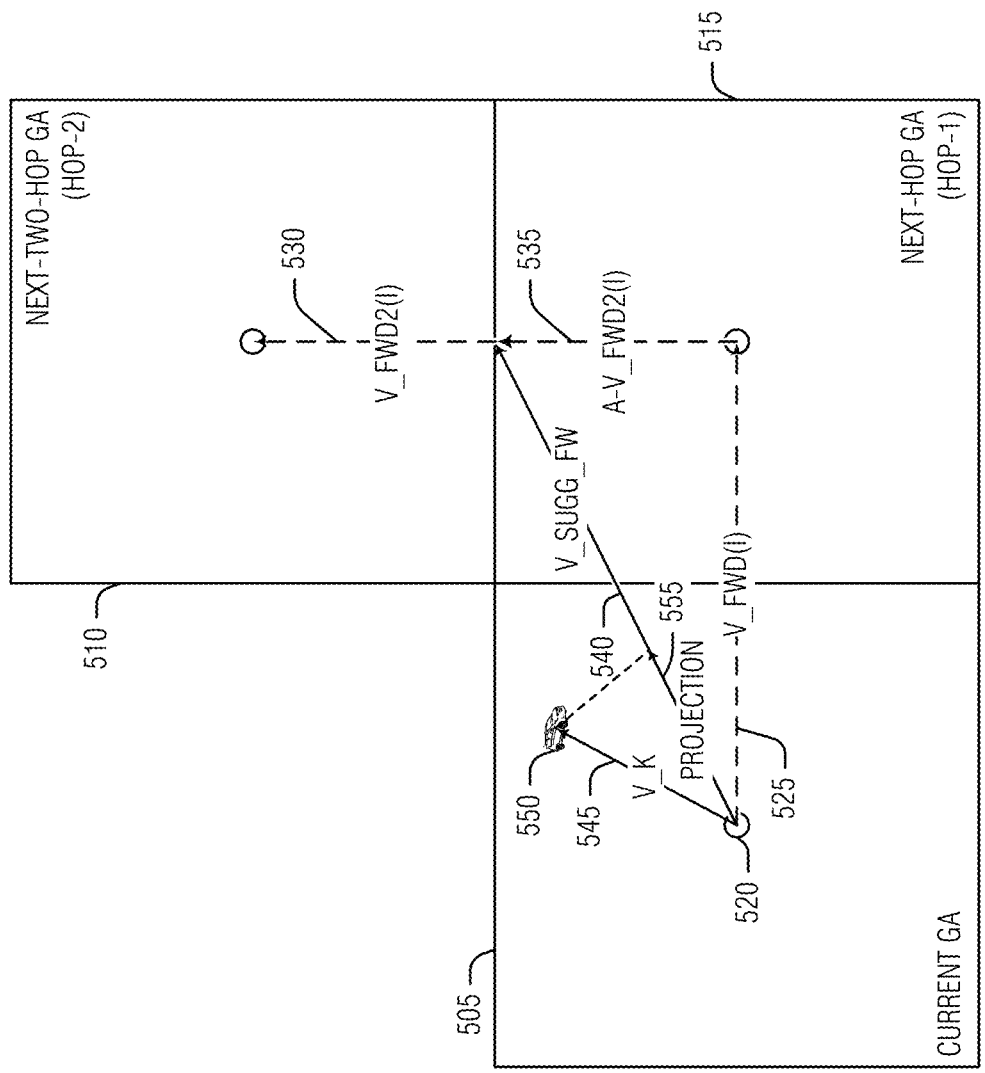
FIG. 5 illustrates an example of a vector calculation used in a geographic area dependent transmit timer calculation, according to an embodiment.
Figure 6:
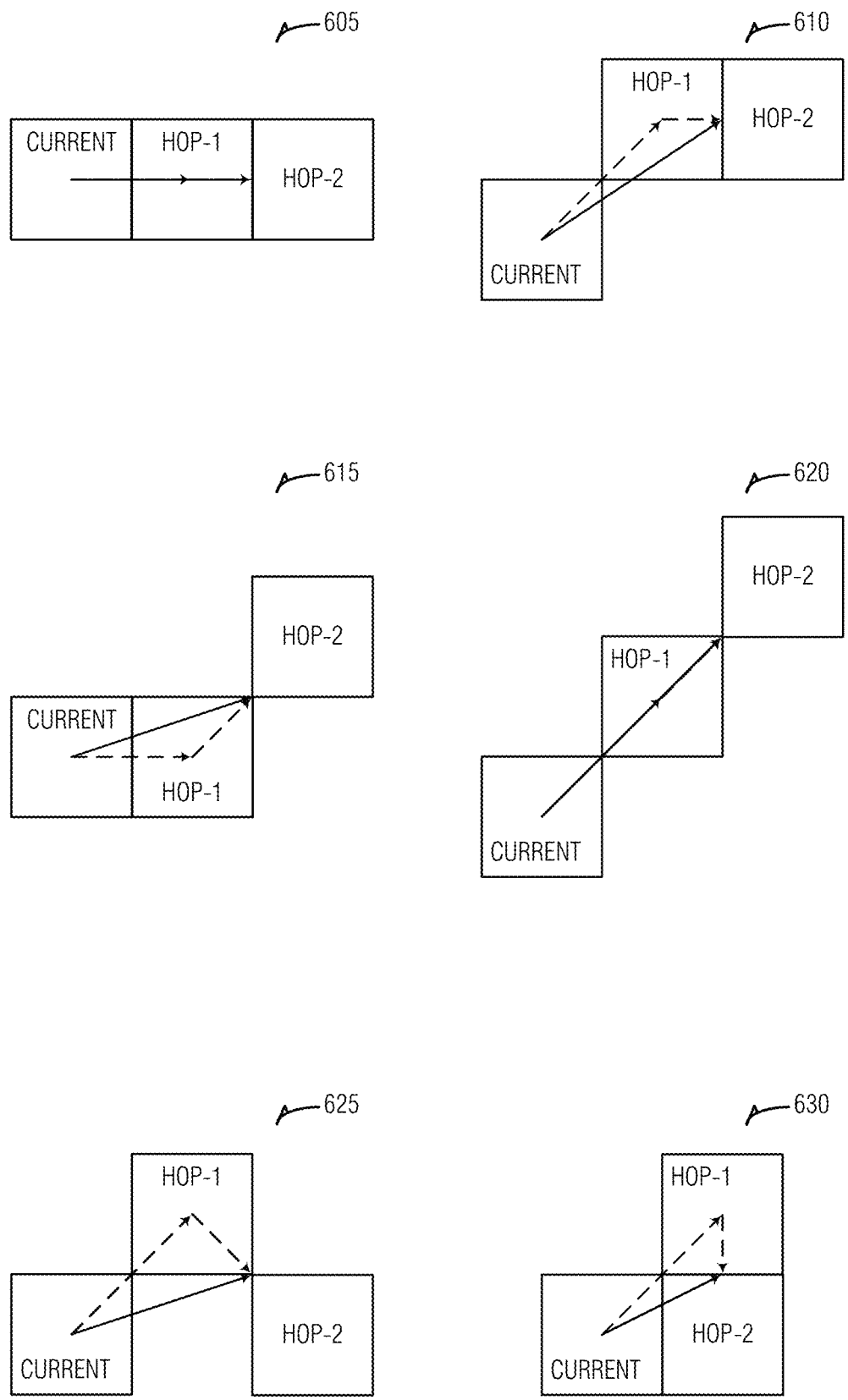
FIG. 6 illustrates examples of different geographic area relationships for a vector calculation used in a geographic area dependent transmit timer calculation, according to an embodiment.

When the interest packet arrives at a node 125 with the targeted resources, the node 125 initiates the response phase by generating a data packet of type I. (A type II data packet is described below and refers to any data packet that does not include the targeted result). The type I data packet includes both the target result (e.g., that queried targeted resource information) and the live map information read from the interest packet. The data packet then routes back along the data-GA-path, recorded in the interest packet, which is typically the reverse GA sequence of the one traveled by the corresponding interest packet. At each hop, one or multiple nodes having received the data packet within a GA on the data-GA-path obtain the forwarding responsibility and forward the data packet to the next-hop GA by GA constrained multicast—an example of which is illustrated in FIGS. 5-6 and described below.

In an example, the data packet routing adaptively addresses situations when the consumer 105 is in the same GA when the interest was sent or has moved to a different GA. For example, if the data packet arrives at the GA where the consumer 105 is located, the routing goes into the last-hop-forwarding. If the node having received the packet is not the consumer 105 but has information that the consumer 105 is in the same GA, the node unicasts the data packet to the consumer 105 for a predetermined number of attempts after waiting for a random time. IF the node receives an acknowledgment (ACK) from the consumer 105 before sending the data packet, the node stops the forwarding procedure for the data packet. Otherwise, the node forwards the data packet. When the consumer 105 receives the data packet, the consumer 105 broadcasts an ACK to nodes in the GA to end the response phase.

If, however, the consumer 105 has moved to a new GA following the original data-GA-path may not enable the data packet to reach the consumer 105. To address this issue, the interest packet may include a transportation plan (e.g., travel route) as, for example, a sequence of GAs the consumer 105 plans to traverse. This sequence, copied to the data packet by the resource 125, may be used by the data packet forwarding nodes to make adaptive forwarding decisions. For example, if the new GA happens to be on the original data-GA-path, the data packet will arrive at new GA before arriving at original GA. Once the data packet arrives at the new GA, the forwarding node may have detected the consumer 105 (e.g., through intra-GA messaging) in the GA. In this case, the forwarding node may perform the last-hop-forwarding.

If the new GA is not on the original data-GA-path, any data packet forwarding node may update the data-GA-path in the data packet by concatenating the non-overlapping segments of the original data-GA-path and the consumer's travel plan. Here, the route is effectively changed for future forwarding nodes, enabling the data packet to reach the consumer 105.

In an example, predictive routing may be employed. As mentioned above, any node may be mobile. Thus, the source 135 and target resource 125 may change locations between the time the interest packet was sent to the time when the data packet is received. Here, the routing sequence may be calculated based on predicted locations of the source 135 or the target 125. This calculation may include an expected round-trip time for the interest and data packets. To perform this calculation, a node may maintain a location timer wheel for itself and all known peers. Here, every element of the timer wheel maintains the relevant location information.

In an example, just-in-time (JIT) delivery may be used with the predicted location of the consumer 105 or the target 125. JIT ensures that the message (e.g., interest or data packet) is not delivered too late (e.g., because the intended recipient node already left the predicted location). Further, JIT may enable optimizing (e.g., minimizing) buffering used waiting the intended recipient node to arrive to the predicted location (e.g., the message arrives to the intended recipient GA before the intended recipient node and is stored in the GA until the intended recipient node arrives). Such buffering for JIT delivery may occur in one or more nodes as needed. For example, a single node may buffer the message for predetermined period of time, or multiple nodes may buffer the message for shorter period of time to achieve the same goal.

In an example, it is possible that existing maps of source 135, target 125, or intermediate nodes (e.g., forwarding node 130) cannot (e.g., optimally) deliver messages. Here, the locations or timings of additional intermediate may be calculated to achieve the intended result. Examples of such intermediate nodes may include drones (e.g., instructed to mode to such locations at the desired times), parked cars (with services enabled) among others.

A type II data packet is created when the interest delivery phase terminates due to a vacant-GA or other termination metric is reached. Thus, if a node receiving the interest packet does not detect a node in its neighborhood GAs, the node may generate a type II data packet start forwarding the data packet back to the consumer 105 to initiate the response phase. The type II data packet does not include the target result, and thus operates to communicate live map information collected from the interest packet and each forwarder of the data packet. Type II data packets are not as time sensitive as type I data packets. Therefore, type II data packets may have a lower forwarding priority than type I data packets. This enables the forwarding nodes to hold type II data packets for a predetermined amount of time before forwarding in order to aggregate several versions of the data packet and reduce the number of forwarding transmissions. Again, because the interest packets are typically multicast to multiple GAs in different directions at each hop—resulting in multiple backward data packet streams—and delivery of type II data packets is not as time sensitive as type I data packet delivery, the forwarding node may aggregate multiple type II data packets from different neighbor GAs into a single data packet to forward at each hop. This operation can significantly reduce the network traffic burden.

The interest delivery and response phases described above illustrate the techniques used to route both interest and data packets. As noted above, the interest and data packets include information from the traversed GAs that may be used to create or update a live map. In an example, each node maintains a local GA-level live map of services or infrastructure available in the GA. This local live map facilitates routing to the resource 125 as well as around vacant GAs. In an example, the GA-level live map includes a node density of the GA. In an example, the GA-level live map includes compute capabilities of entities in the GA, such as processing, storage, software, sensing, AI, accelerators, etc.

During either interest or data packet forwarding, any overhearing node (e.g., any node in a GA on the interest/data-GA-path, or any node in a GA neighboring to the GAs on the interest/data-GA-path, or the nodes forwarding the packets) can create/update its local live map of resource locations or GA-level node distributions over the network may be created or updated by the nodes on the forwarding path (e.g., any node in a GA on the interest or data-GA-path forwarding path or the only nodes forwarding the packets). In an example, the consumer 105 starts the process by including this information in the initial transmission of the interest packet. In general, the area of the live map is limited by the discovery scope, such as the maximum hop count.

Upon receiving any packet, a node may read the live map information and update a local live map. Any forwarding node may modify, or append to, the live map information in the packet before forwarding the packet. The data added to the packet by the forwarding node includes GA-level live map information that may be obtained from intra-GA messaging, or a periodic message exchange among nodes in a GA.

In an example, intra-GA messaging may include, for each node, a periodic broadcast of a hello message. The hello message may include a current geo-location of the node, a current GA of the node, or computing resources provided by the node, such as equipment, data, software, storage, connectivity, encode-decode, sensing, or AI capabilities among others.

Each recipient of a hello message may record the information in the hello messages to maintain an accurate representation of nodes and resources in a GA. In an example, a node may provide occupancy level estimates within its GA based on sensing or AI capabilities. Again, this GA-level live map information may be written into interest or data packets passing through the GA.

In an example, the hello message is signed (e.g., cryptographically signed by the node transmitting the hello message). In an example, the hello message is secured (e.g., encrypted). This may enable the hello message to distinguish between recipients, enabling devices to restrict which nodes get which information—e.g., a government entity may share secret GA-level live map information to only other government devices. In an example, parts of the hello message may be signed or secured differently to enable a single hello message to target different tenants or trusted groups. In an example, a trusted device may be prioritized over other devices.

In an example, the information shared among the various nodes (e.g., returned in a data packet or included in live map updates in interest or data packets) may have an expiration time (e.g., the data becomes stale or unreliable thereafter). In an example, the information may include a signature for the creator of the information. In an example, nodes may include a data structure (e.g., database) of trusted authorities or entities to whom data is trustworthy. Such signature security may avoid misleading, erroneous, or potentially malicious data. In an example, a node may include a subset of certificates that may be related to manufacturers or authorities.

Figure 2:
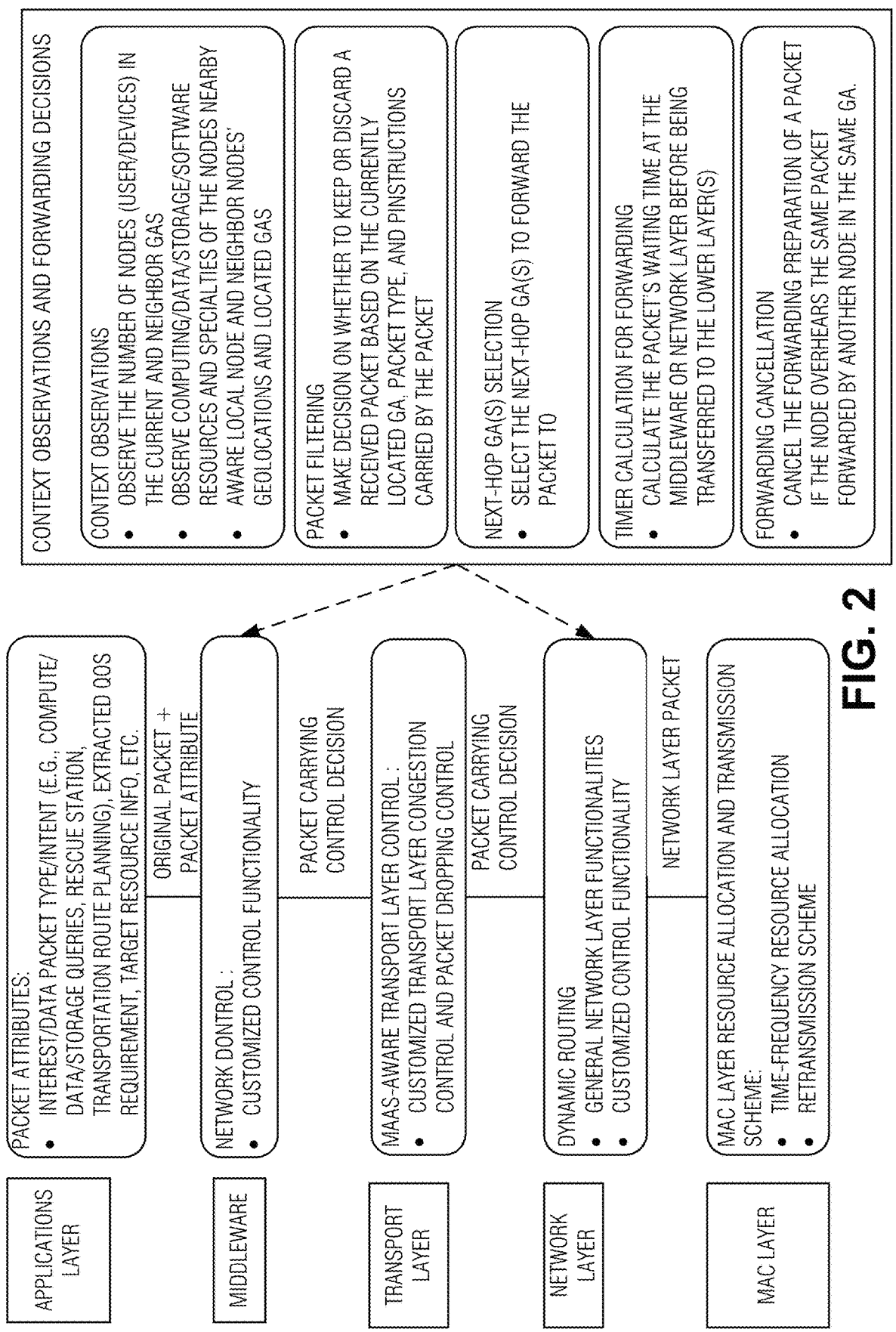
FIG. 2 illustrates an example of network control components across layers, according to an embodiment.

FIG. 2 illustrates an example of network control components across layers, according to an embodiment. FIG. 2 illustrates a relationship between open system interconnection (OSI) network layers and forwarding decisions in the context of the routing described above with respect to FIG. 1. As noted above, the routing is distributed such that each node makes its local and adaptive forwarding decisions for interest or data packets. This arrangement results in efficient operations. The components illustrated in FIG. 2 may be implemented in different OSI layers (e.g., in the Middleware or the Network Layer). Accordingly, the components enable a node to adaptively forward the interest or data packets across multiple layers common to Cloud, Fog, Edge, Internet of Things (IoT), or other arrangements of devices.

Figure 3:
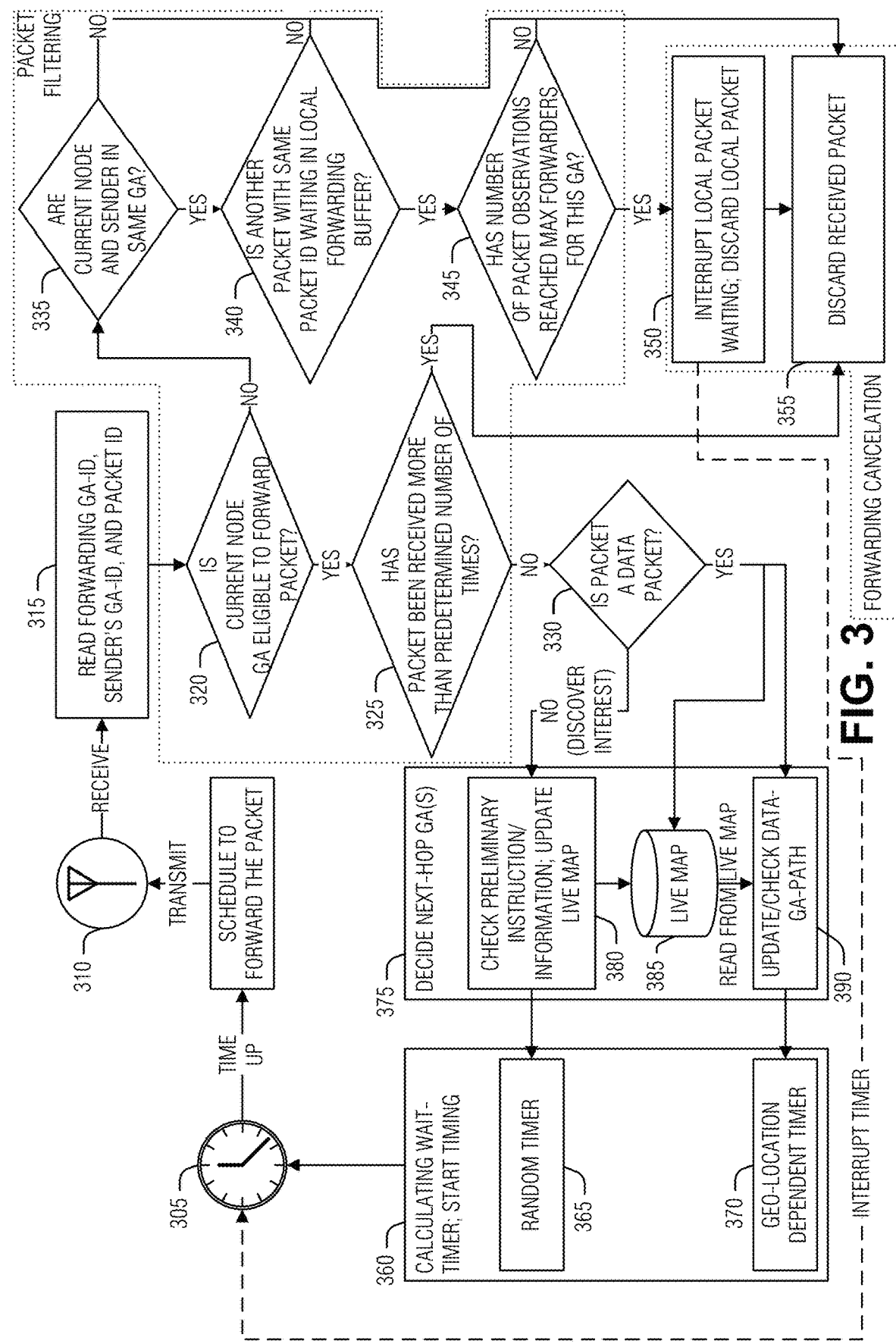
FIG. 3 illustrates an example of a packet handling flow for geographic routing, according to an embodiment.

FIG. 3 illustrates an example of a packet handling flow for GAA routing, according to an embodiment. In general, a node filters the received packets—including identifying its eligibility to forward a packet, interrupt waiting packets, and canceling unnecessary forwarding—and chooses the next-hop GA(a). Here, nodes may compete for the next-hop forwarding responsibilities. Examples of details of the next-hop forwarder, which may arise from any receiving nodes in the next-hop GA, wait-timer mechanism is illustrated and described below with respect to FIGS. 4A-6.

As illustrated, a packet is received at a transceiver 310. The node gathers information from the packet (operation 315) and decides whether it is in a GA eligible to forward the packet (decision 320). Generally, if it is an interest packet the node is GA is eligible unless interest targeting is employed. If it is a data packet, the GA is eligible if listed at the target GA (e.g., via the illustrated GA-ID) in the packet.

If the node is eligible to forward the packet, the node counts how many other nodes in the GA have forwarded the packet and determines whether this number is less than a predetermined number (e.g., number of allowed forwarders) (decision 325). If yes, the packet is discarded (operation 355). If no, the node determines whether the packet is a data packet (decision 330). The node then moves on to determine the next-hop GAs (component 375). If the packet is an interest packet, the live-map information is read from the packet (operation 380) and stored in the local live map 385. The packet is then queued 360 with and a random time generated (operation 365) and applied to the timer 305. When the timer 305 expires, the packet is transmitted by the transceiver 310.

If the packet is a data packet, the live map information from the data packet is used to update the local live map 385. The GA-data-path from the packet is extracted (operation 390) and used to generate a geographic area dependent time (operation 370) applied to the timer 305. The packet is queued (operation 360) and sent by the transceiver 310 upon expiration of the timer 305.

If the GA (and thus the node) are not eligible receivers of the packet (from decision 320), the node determines whether the sender of the packet is in the same GA as the node (decision 335). If no, the packet is discarded (operation 355). If yes, the node determines whether another version of the packet is queued 340. If no, the packet is discarded (operation 355). If yes, the node determines whether the number of packet forwards is has reached the maximum number of forwarders (decision 345). If no, the packet is discarded (operation 355). If yes, a timer for the queued packet is interrupted (it was awaiting transmission), the local packet is discarded (operation 350) and the received packet is discarded (operation 355).

Figure 4A:
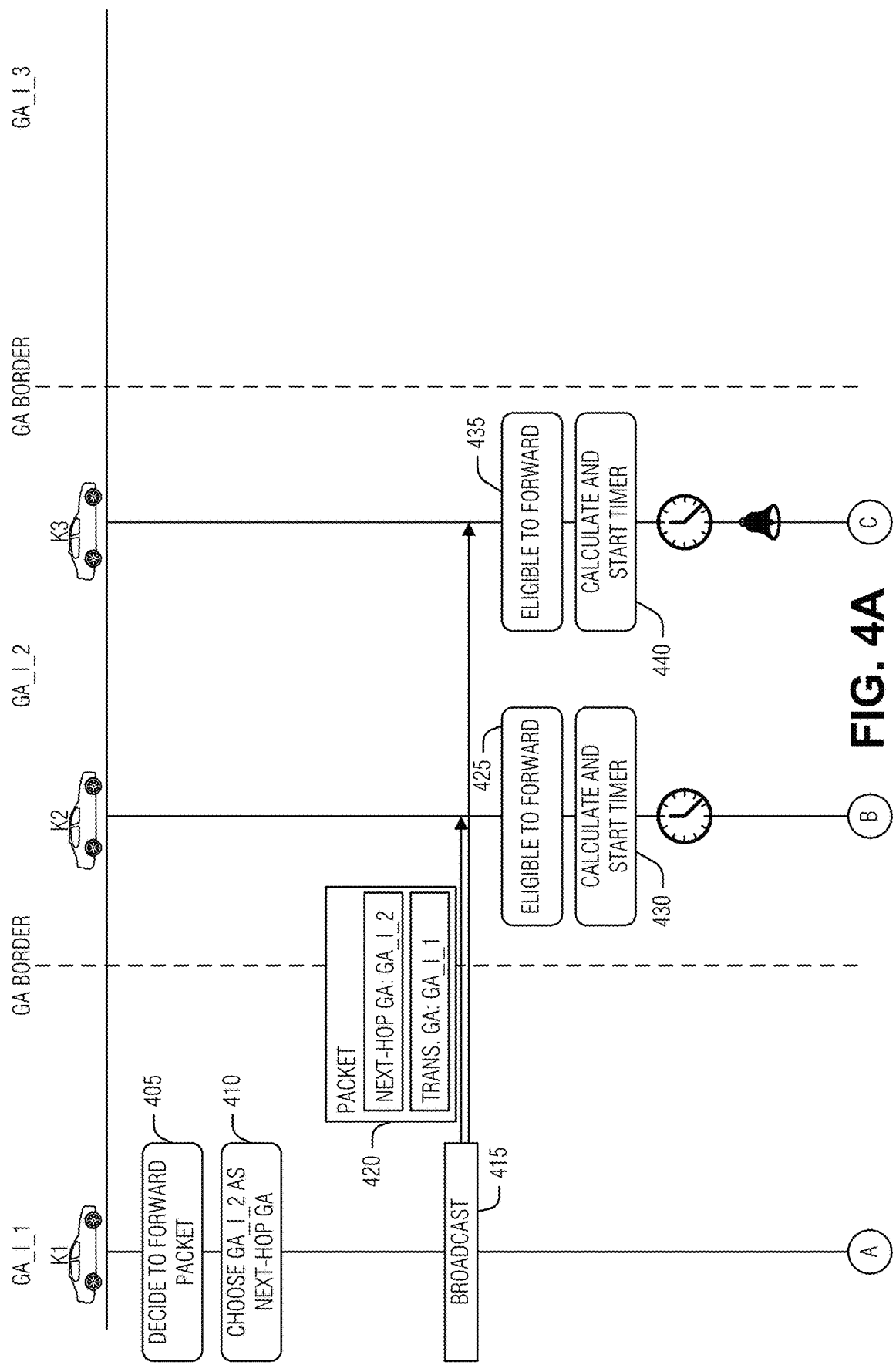
FIGS. 4A-4B illustrate an example of a packet flowing across geographic areas, according to an embodiment.

FIGS. 4A-6 illustrate aspects of the transmission wait timer (e.g., transmit timer), including a GA-constrained wait timer. FIGS. 4A-4B illustrate an example of a packet flowing across geographic areas, according to an embodiment. As illustrated, three nodes (e.g., vehicles) K1, K2 a K3 are forwarding a packet across three GAs, $GA_{i1}$, $GA_{i2}$, and $GA_{i3}$. K1 decides to forward the packet (operation 405), writes the current GA and the destination GA into the packet (operation 410) and broadcasts (operation 415) the modified packet 420.

In general, each node K2 and K3 having received the packet 420 determines whether it is in a GA eligible to forward the packet 420 (here $GA_{i2}$ as specified in the packet 420). K2 (operation 425) and K3 (operation 435) competes for the forwarding responsibility using a transmit timer mechanism. For example, K2 calculates and starts a timer (operation 430) as does K3 (operation 440). For non-geographic-area-dependent forwarding, the timer is a random time between a maximum and a minimum. Thus, it is likely that only one node's timer will expire at a time. Here, K3's timer expires (operation 450) and K3 decides to forward the packet 420 (operation 455). K3 modifies the packet 420 to include the current GA and a new target GA (operation 460) and broadcasts the packet 470 (operation 465). Because it is a broadcast, the packet 470B crosses into $GA_{i3}$ and the packet 470A is received throughout $GA_{i2}$.

K2's timer has not yet expired, so the packet 420 is held locally. When packet 470A is received by K2, K2 determines that 470A matches the packet 420 (operation 475). In response, K2 interrupts the timer (operation 480) and discards both the locally held packet 420 as well as the overheard packet 470A (operation 485). The last three operations are performed based on a maximum number of forwarders defined for GA, which may be defined in the packet. Thus, forwarding is canceled only if more transmissions for the same packet than the maximum number of forwarders have been detected.

FIG. 5 illustrates an example of a vector calculation used in a geographic area dependent transmit timer calculation, according to an embodiment. In an example, GA-constrained forwarding differs from other forwarding by biasing the transmit timer towards nodes physically located near the transmission direction. In general, the closer a node 550 is to a next-hop GA 515, the smaller the node's timer is. Thus, the node 550 is more likely to forward the packet before other nodes in the GA that are farther away from the next-hop GA 515.

Figure 4B:
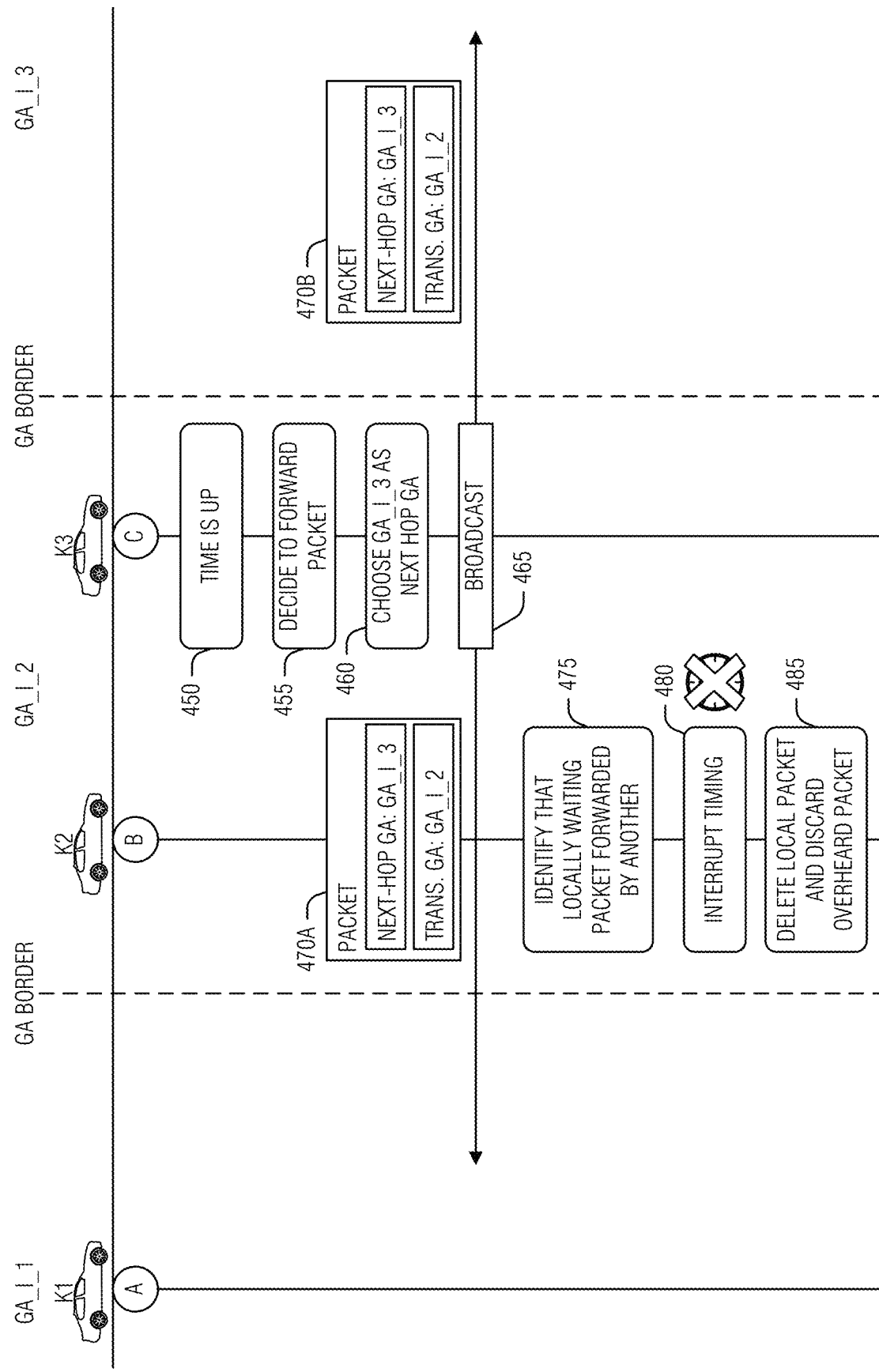

In an example, the geographic area dependent transmit timer's value is calculated based on the node's geo-location, the direction of the next-hop GA 515, and possibly the direction of the next-two-hop GA 510. In general, this information is locally available to the node 550. Thus, no communication or coordination overhead is incurred resulting in an efficient and fully distributed mechanism. Again, nodes having the same packet to forward start forwarding at different time due to their different geo-locations. Setting the geographic area dependent transmit timer in this way enables nodes closer to the next-hop GA 515 and possibly the next-two-hop GA 510 to have larger chance to forward the packet earlier than other nodes. The illustration in FIGS. 4A-4B represent this reality as the timing at node K3 is shorter than the timing of node K2 because K3 is closer to $GA_{i3}$ than K2.

In an example, the geographic area dependent transmit timer includes a geo-location-dependent portion plus a random fluctuation portion. The geo-location-dependent portion of the timer differentiates the waiting time between nodes at different locations. The calculation described below and illustrated in FIGS. 5-6 incorporates both the next-hop GA's direction and the next-two-hop GA's direction. However, the same technique may be used with more or fewer next-hop GAs.

Because the data packet carries the data-GA-path, an arbitrary forwarding node k 550 located at $GA_i$ 505 may read the next-hop GA 515, denoted by $GA_{fwd(i)}$, and the next-two-hop GA 510, denoted by $GA_{fwd^2(i)}$. By the 2-D Cartesian coordinates of node k 550, the geometric center points (e.g., center 520) of $GA_i$ 505, $GA_{fwd(i)}$ 515, and $GA_{fwd^2(i)}$ 510 may be respectively denoted by $(x_k, y_k)$, $(x_{GA_i}, y_{GA_i})$, $(x_{GA_{fwd(i)}}, y_{GA_{fwd(i)}})$, $$(x_k, y_k), (x_{GA_i}, y_{GA_i}), (x_{GA_{fwd(i)}}, y_{GA_{fwd(i)}}), (x_{GA_{fwd^2(i)}}, y_{GA_{fwd^2(i)}}).$$

To obtain the geographic area dependent transmit timer, denoted as $T_{geo}^k$, the following operations may be used. First, a relative location vector 545 is calculated with respect to k 550 and the center point 520:

$$v_k \triangleq [x_k - x_{GA_i}, y_k - y_{GA_i}].$$

Second, the next-hop direction component $v_{fwd(i)}$ 525 and the next-two-hop direction component $v_{fwd^2(i)}$ 530 vectors are calculated:

$$v_{fwd(i)} \triangleq [x_{GA_{fwd(i)}} - x_{GA_i}; y_{GA_{fwd(i)}} - y_{GA_i}];$$

$$v_{fwd2(i)} \triangleq [x_{GA_{fwd2(i)}} - x_{GA_{fwd(i)}}; y_{GA_{fwd2(i)}} - y_{GA_{fwd(i)}}].$$

A control parameter a may be applied to $v_{fwd^2(i)}$ 530 to provide emphasis of the expected next-two-hop GA's direction relative to the next-hop GA's direction, resulting in the vector $\alpha v_{fwd^2(i)}$ 535.

Third, a suggested forwarding direction vector $v_{sugg\_fwd}$ 540 as $$v_{sugg\_fwd} = v_{fwd(i)} + \alpha v_{fwd^2(i)}.$$

Fourth, the suggested forwarding direction vector 540 as:

$$\hat{v}_{sugg\_fwd} \triangleq \frac{v_{sugg\_fwd}}{\|v_{sugg\_fwd}\|},$$

where $\|*\|$ represents the Euclidian norm (vector length).

Fifth, use a reference time value $T_{geo}^{ref}$ obtained from the packet to calculate the geo-location-dependent timer portion as:

$$T_{geo}^k = T_{geo}^{ref}\left[1 - \frac{\langle v_k, \hat{v}_{sugg\_fwd}\rangle}{D_i}\right],$$

where $\langle *,* \rangle$ represents inner product in Euclidian vector space, and $D_i$ is a normalizing factor depending on the size of $GA_i$. In the above formulation, $\langle v_k, \hat{v}_{sgg\_fwd}\rangle$ represents the projection 555 of vehicle's location vector 545 on the suggested forwarding vector 540. The larger $\langle v_k, v_{sgg\_fwd}\rangle$ is, the closer node k 550 is to the next-hop GA 515 and the next-two-hop GA 510.

In an example, the value of $D_i$ may be calculated in the following way. Assume that the $GA_i$ 505 and $GA_{fwd(i)}$ 515 share an edge as the division border:

1. Define vector $a_i \triangleq \frac{1}{2} v_{fwd(i)}$.
2. Define vectors $a_{i,1}^{\perp} \triangleq [y_{GA_i} - y_{GA_{fwd(i)}}; x_{GA_{fwd(i)}} - x_{GA_i}]$ and $a_{i,2}^{\perp} \triangleq -a_{i,1}^{\perp}$.
3. If $\langle a_{i,1}^{\perp}, v_{fwd^2(i)}\rangle \geq 0$, define $$\hat{a}_i^{\perp} \triangleq \Delta \frac{a_{i,1}^{\perp}}{\|a_{i,1}^{\perp}\|};$$

otherwise, define $$\hat{a}_i^{\perp} \triangleq \Delta \frac{a_{i,2}^{\perp}}{\|a_{i,2}^{\perp}\|}.$$

4. Assume node k 550 knows the border edge's length denoted by $E_{i,fwd(i)}$. Then define vector $b_i \triangleq a_i + \frac{1}{2} E_{i,fwd(i)} \hat{a}_i^{\perp}$.
5. Calculate $D_i = \langle b_i, v_{sugg\_fwd}\rangle$.

If the two GAs share a vertex (as illustrated between the current GA 505 and GA 510), then:

1. Define vector $b_i \triangleq \frac{1}{2} v_{fwd(i)}$.
2. Calculate $D_i = \langle b_1, \hat{v}_{sugg\_fwd}\rangle$.

The random time portion of the geographic area dependent transmit timer provides a random fluctuation on the timer's total value for each node to better deviate the forwarding time of clustering nodes whose geo-locations have little difference. For example, this time portion, denoted by $T_{rand}^k$ for node k 550, may be uniformly distributed between 0 and a fluctuation range $T_{rand}^{max}$. In an example, geographic area dependent transmit timer's value may be $T_k$ as the total waiting time set for a packet by vehicle k 550, calculated by:

$$T_k = T_{geo}^k + T_{rand}^k.$$

FIG. 6 illustrates examples of different geographic area relationships for a vector calculation used in a geographic area dependent transmit timer calculation, according to an embodiment. The techniques described above with respect to FIG. 5 applicable to the various arrangements of a current GA, a next-hop GA, and a next-two-hop GA, illustrated here. The arrangement 605 is a rightward projection, which has corollaries in the left, up, and down directions. Arrangements 610, 615, and 620 all illustrate the possible diagonal relationships between these GAs, and the arrangement 625 illustrates a jagged or wavy arrangement. Each illustration indicates the suggested forward vector as a solid line, the dashed lines representing the component vectors $v_{fwd(i)}$ and $\alpha v_{fwd^2(i)}$.

Figure 7:
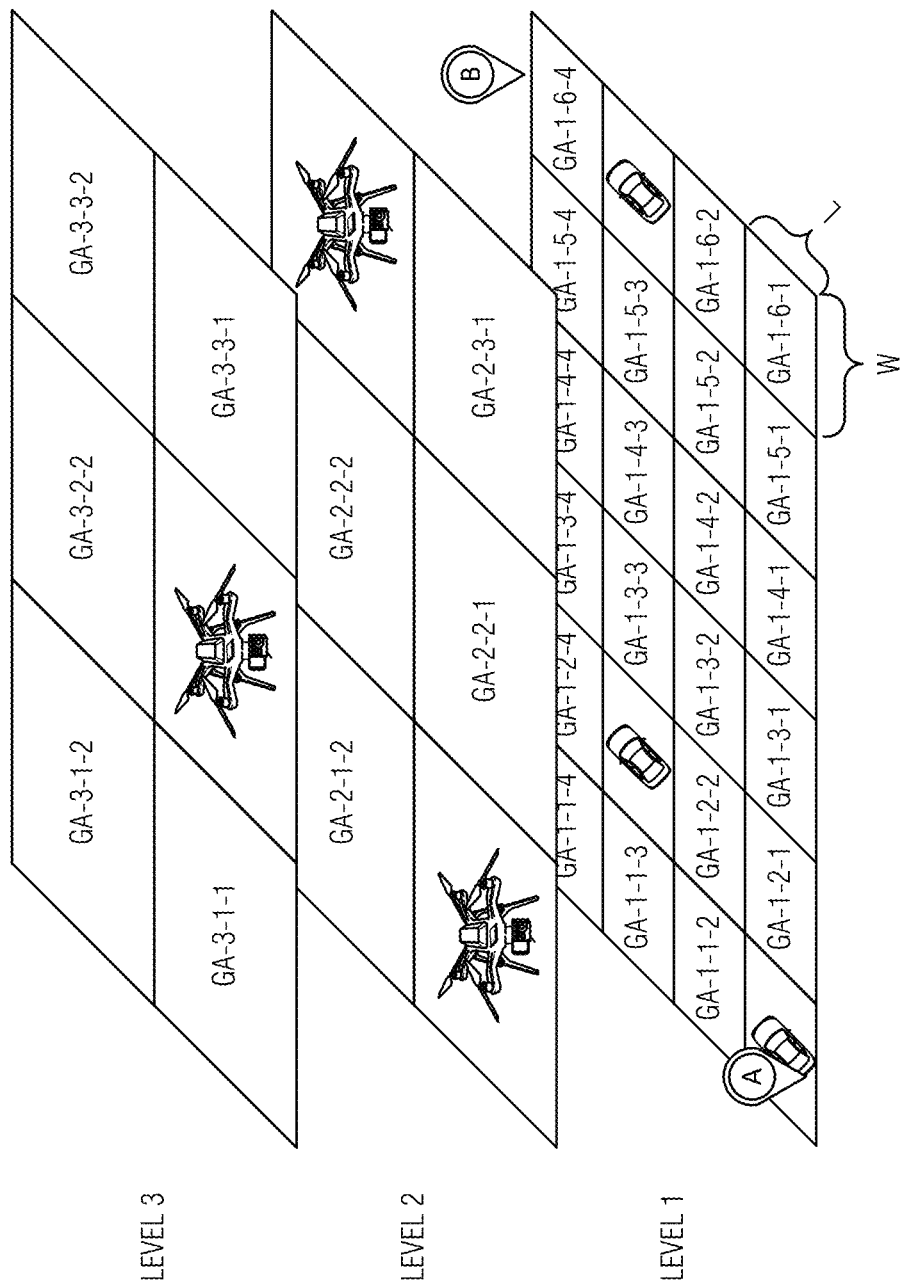
FIG. 7 illustrates an example of geographic area addressing, according to an embodiment.

FIG. 7 illustrates an example of geographic area addressing, according to an embodiment. The consumer and target resource are denoted by the markers A and B respectively. A given physical area is divided into a number of GAs or grids. In an example, the dimension of grids may be configured arbitrarily, but the dimension is generally constrained by the RF environment, such that a transmission from a node in one GA will reach nodes in neighboring GAs. Each grid of length L and width W is uniquely represented using a finite string. For example, a geo-hash produces a unique sequence of symbols for a given pair of latitude and longitude bounded within a grid. Here, a longer sequence represents a smaller grid size and offers better precision. Thus, an eight-symbol-long geo-hash may represent a grid of dimension 38.2 meters by 19 meters and a nine-symbol long geo-hash may represent a grid of dimension 4.8 meters×4.8 meters.

For more than two dimensions, layers of two-dimensional grids may be used to use presence of elevated radio towers, highways, or drones. Dividing layers in the elevated dimension groups the wireless environment at different altitudes, which in turn results in different GA dimensions across layers. For example, due to prevalent availability of line-of-sight, the GA dimension in the higher layer where drones are flying is larger than that of the bottom layer, or ground. The unique geo-area (GA) identifier of a vehicle or drone located at <latitude, longitude, and altitude-depth> may be calculated using a pre-defined conversion function. For example:

$$f(lat,long,alt,L,W,H)=\text{concat}(\text{geoHash}(lat,long,L,W), \text{Layer}(alt,H)).$$

Here, L, W, and H are pre-configured values denoting the desired grid dimension in 3D space. For a given tuple of <latitude, longitude, altitude>, this function calculates a geo-hash based on 2-D grid dimension and then concatenates a layer number (e.g., calculated based on the altitude factor) to the geo-hash. This is effectively converting a geo-area map into a layered set of grids with dimension L×W.

The GA dimension (L×W) should be selected such that several nodes are present in the neighboring GAs to receive and forward packets. Presence of multiple nodes in the neighboring GAs improves the likelihood of reception of data. Hence, the node RAT transmission range plays an important role in GA dimension selection. If the GA dimension is too small compared to the transmission range, some issues may occur. For example, many neighboring nodes (e.g., in multiple nearby GAs) may become eligible next-hop forwarders and contend with each other—especially for the multicast-based forwarding mechanism—due to the hidden terminal problem. Here, the multiple nodes may forward the same packet simultaneously causing collision or flooding problem in the network. Another issue that may occur, delay may be added due to an increased number of hops.

If, however, the GA dimension is too close to the transmission range, there may not be enough eligible forwarders present in the neighborhood due to poor wireless link quality. This may eventually impact end-to-end packet delivery rate. Distance may not be the only factor affecting packet reception. For non-line-of-sight (NLoS) signal due to presence of obstructions (e.g., buildings, hills, etc.), link quality may deteriorate significantly compared to the line-of-sight case. Physical context (e.g., is the area rural or urban, density of structures or nodes, etc.) may also pl[ay a part. For example, in an area with sparse traffic, increasing the GA size as much as possible and consider nodes from more than one nearby GAs as eligible forwarders may be helpful.

To make these decisions on GA dimension, high-definition (HD) maps (e.g., constructed for autonomous vehicles and captures every detail on the road and surrounding infrastructure) may be used in offline fashion to resolve these issues. In an example, the infrastructure may use traffic pattern data (e.g., during a 24-hour period for a particular area). Based on such information, appropriate GA size may be recommended for a given area, time granularity, or radio access technology. In an example, nodes may download the HD map of GAs from the infrastructure and choose an appropriate configuration (e.g., dimension) based on their current location. In an example, RSU broadcast the map of GAs for the nearby area and may update or override previous configuration depending on the real-time context.

Figure 8:
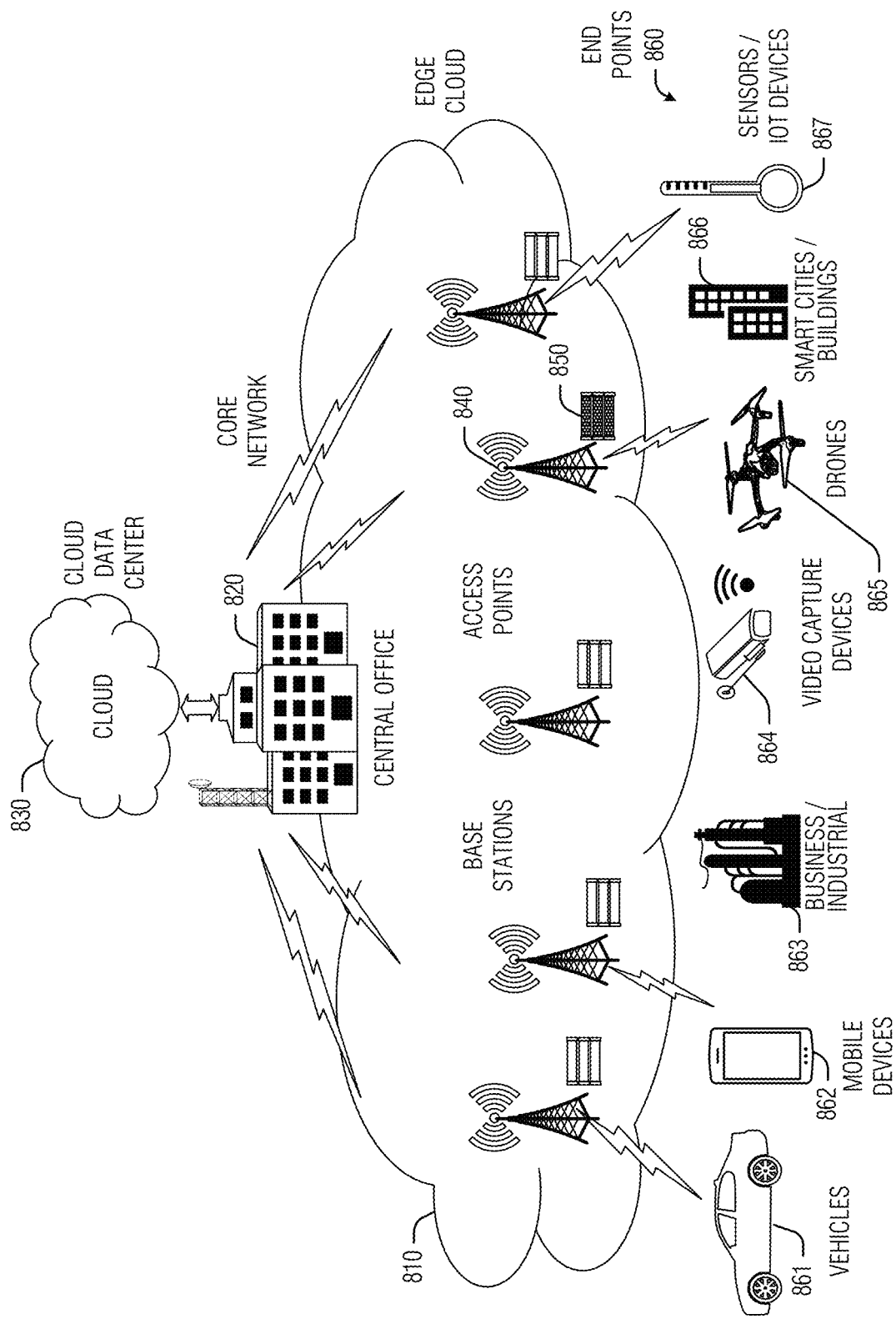
FIG. 8 illustrates an overview of an edge cloud configuration for edge computing.

FIG. 8 is a block diagram showing an overview of a configuration for edge computing, which includes a layer of processing referred to in many of the following examples as an "edge cloud". As shown, the edge cloud 810 is co-located at an edge location, such as an access point or base station 840, a local processing hub 850, or a central office 820, and thus may include multiple entities, devices, and equipment instances. The edge cloud 810 is located much closer to the endpoint (consumer and producer) data sources 860 (e.g., autonomous vehicles 861, user equipment 862, business and industrial equipment 863, video capture devices 864, drones 865, smart cities and building devices 866, sensors and IoT devices 867, etc.) than the cloud data center 830. Compute, memory, and storage resources which are offered at the edges in the edge cloud 810 are critical to providing ultra-low latency response times for services and functions used by the endpoint data sources 860 as well as reduce network backhaul traffic from the edge cloud 810 toward cloud data center 830 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 9:
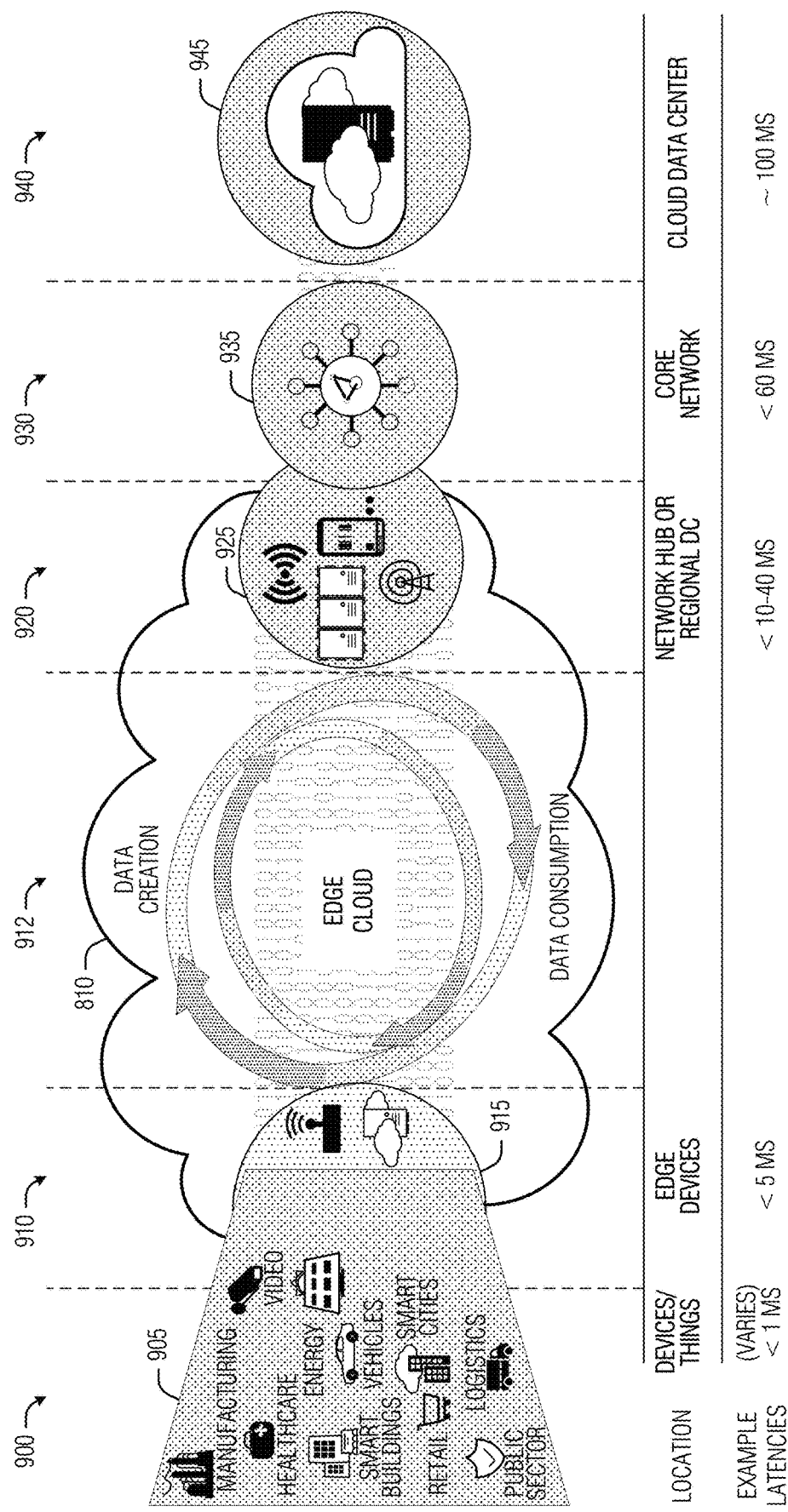
FIG. 9 illustrates operational layers among endpoints, an edge cloud, and cloud computing environments.

FIG. 9 illustrates operational layers among endpoints, an edge cloud, and cloud computing environments. Specifically, FIG. 9 depicts examples of computational use cases 905, utilizing the edge cloud 810 among multiple illustrative layers of network computing. The layers begin at an endpoint (devices and things) layer 900, which accesses the edge cloud 810 to conduct data creation, analysis, and data consumption activities. The edge cloud 810 may span multiple network layers, such as an edge devices layer 910 having gateways, on-premise servers, or network equipment (nodes 915) located in physically proximate edge systems; a network access layer 920, encompassing base stations, radio processing units, network hubs, regional data centers (DC), or local network equipment (equipment 925); and any equipment, devices, or nodes located therebetween (in layer 912, not illustrated in detail). The network communications within the edge cloud 810 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 900, under 5 ms at the edge devices layer 910, to even between 10 to 40 ms when communicating with nodes at the network access layer 920. Beyond the edge cloud 810 are core network 930 and cloud data center 940 layers, each with increasing latency (e.g., between 50-60 ms at the core network layer 930, to 100 or more ms at the cloud data center layer). As a result, operations at a core network data center 935 or a cloud data center 945, with latencies of at least 50 to 100 ms or more, will not be able to accomplish many time-critical functions of the use cases 905. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 935 or a cloud data center 945, a central office or content data network may be considered as being located within a "near edge" layer ("near" to the cloud, having high latency values when communicating with the devices and endpoints of the use cases 905), whereas an access point, base station, on-premise server, or network gateway may be considered as located within a "far edge" layer ("far" from the cloud, having low latency values when communicating with the devices and endpoints of the use cases 905). It will be understood that other categorizations of a particular network layer as constituting a "close", "local", "near", "middle", or "far" edge may be based on latency, distance, number of network hops, or other measurable characteristics, as measured from a source in any of the network layers 900-940.

The various use cases 905 may access resources under usage pressure from incoming streams, due to multiple services utilizing the edge cloud. To achieve results with low latency, the services executed within the edge cloud 810 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 810 may provide the ability to serve and respond to multiple applications of the use cases 905 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 810 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 810 (network layers 900-940), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 810.

As such, the edge cloud 810 is formed from network components and functional features operated by and within edge gateway nodes, edge aggregation nodes, or other edge compute nodes among network layers 910-930. The edge cloud 810 thus may be embodied as any type of network that provides edge computing or storage resources which are proximately located to radio access network (RAN) capable endpoint devices (e.g., mobile computing devices, IoT devices, smart devices, etc.), which are discussed herein. In other words, the edge cloud 810 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., Wi-Fi, long-range wireless, wired networks including optical networks) may also be utilized in place of or in combination with such 3GPP carrier networks.

The network components of the edge cloud 810 may be servers, multi-tenant servers, appliance computing devices, or any other type of computing devices. For example, the edge cloud 810 may include an appliance computing device that is a self-contained electronic device including a housing, a chassis, a case or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., EMI, vibration, extreme temperatures), or enable submergibility. Example housings may include power circuitry to provide power for stationary or portable implementations, such as AC power inputs, DC power inputs, AC/DC or DC/AC converter(s), power regulators, transformers, charging circuitry, batteries, wired inputs or wireless power inputs. Example housings or surfaces thereof may include or connect to mounting hardware to enable attachment to structures such as buildings, telecommunication structures (e.g., poles, antenna structures, etc.) or racks (e.g., server racks, blade mounts, etc.). Example housings or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, propellers, etc.) or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 13B. The edge cloud 810 may also include one or more servers or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications or other software, code or scripts may execute while being isolated from one or more other applications, software, code or scripts.

Figure 10:
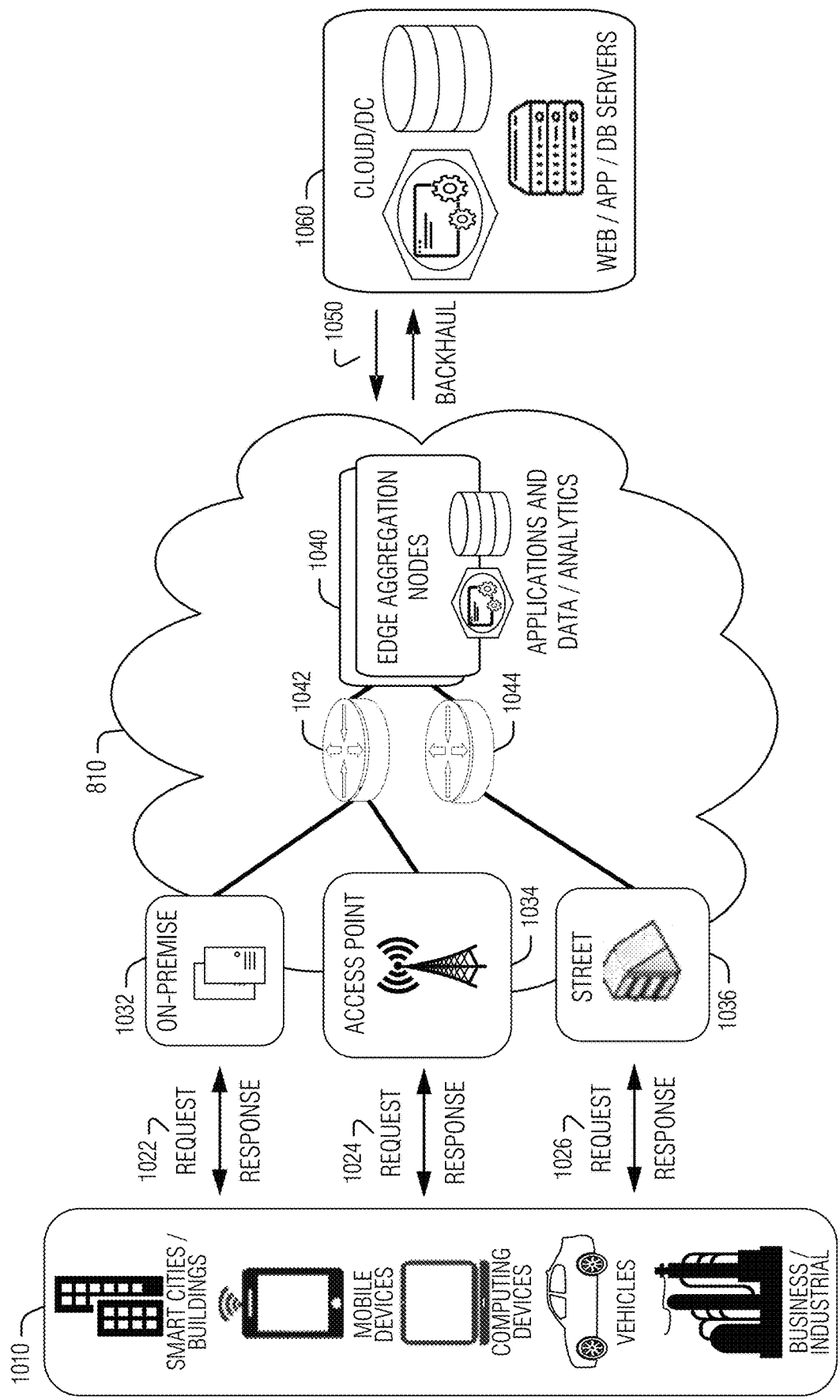
FIG. 10 illustrates an example approach for networking and services in an edge computing system.

In FIG. 10, various client endpoints 1010 (in the form of mobile devices, computers, autonomous vehicles, business computing equipment, industrial processing equipment) exchange requests and responses that are specific to the type of endpoint network aggregation. For instance, client endpoints 1010 may obtain network access via a wired broadband network, by exchanging requests and responses 1022 through an on-premise network system 1032. Some client endpoints 1010, such as mobile computing devices, may obtain network access via a wireless broadband network, by exchanging requests and responses 1024 through an access point (e.g., cellular network tower) 1034. Some client endpoints 1010, such as autonomous vehicles may obtain network access for requests and responses 1026 via a wireless vehicular network through a street-located network system 1036. However, regardless of the type of network access, the TSP may deploy aggregation points 1042, 1044 within the edge cloud 810 to aggregate traffic and requests. Thus, within the edge cloud 810, the TSP may deploy various compute and storage resources, such as at edge aggregation nodes 1040, to provide requested content. The edge aggregation nodes 1040 and other systems of the edge cloud 810 are connected to a cloud or data center 1060, which uses a backhaul network 1050 to fulfill higher-latency requests from a cloud/data center for websites, applications, database servers, etc. Additional or consolidated instances of the edge aggregation nodes 1040 and the aggregation points 1042, 1044, including those deployed on a single server framework, may also be present within the edge cloud 810 or other areas of the TSP infrastructure.

Figure 11:
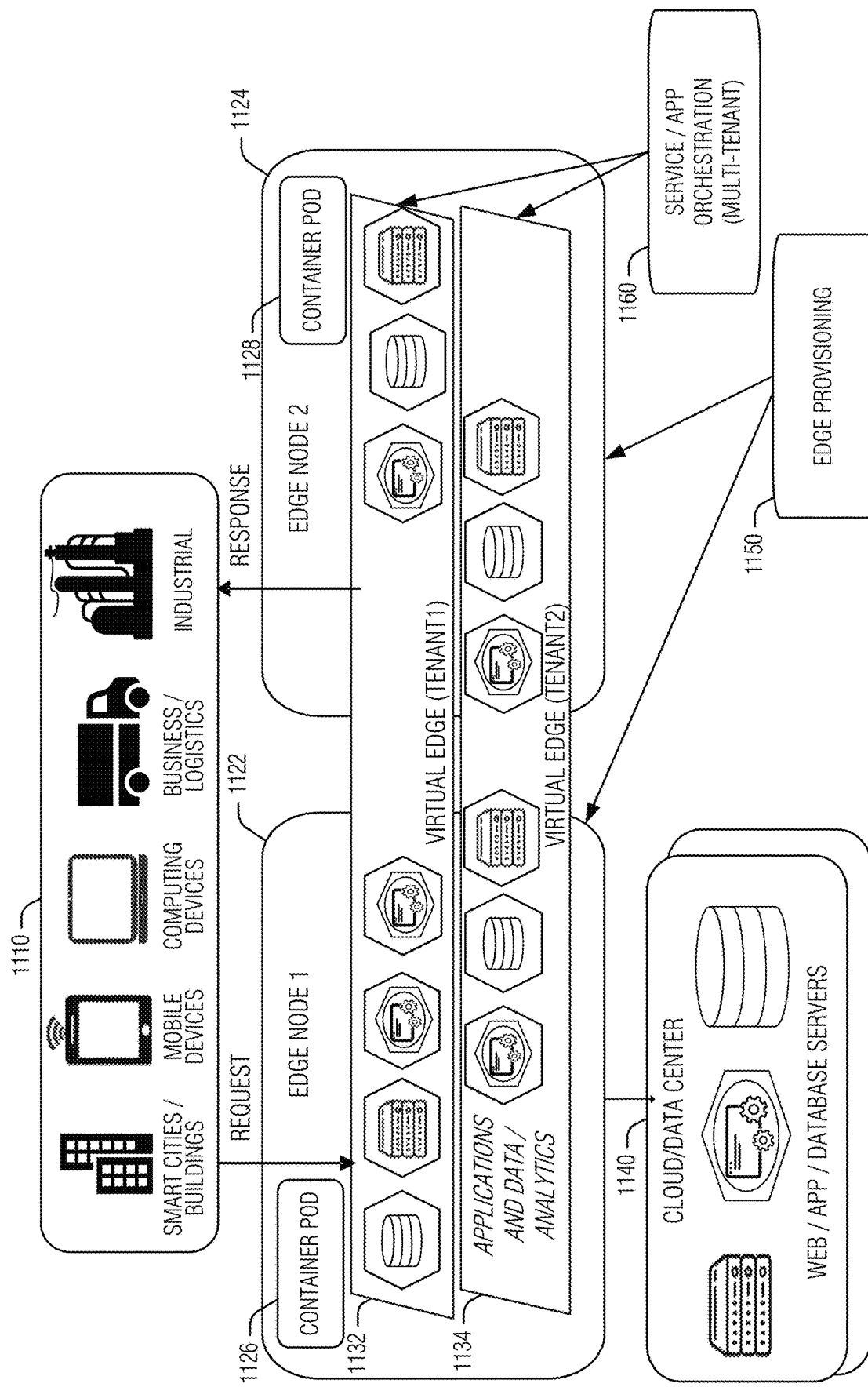
FIG. 11 illustrates deployment of a virtual edge configuration in an edge computing system operated among multiple edge nodes and multiple tenants.

FIG. 11 illustrates deployment and orchestration for virtualized and container-based edge configurations across an edge computing system operated among multiple edge nodes and multiple tenants (e.g., users, providers) which use such edge nodes. Specifically, FIG. 11 depicts coordination of a first edge node 1122 and a second edge node 1124 in an edge computing system, to fulfill requests and responses for various client endpoints 1110 (e.g., smart cities/building systems, mobile devices, computing devices, business/logistics systems, industrial systems, etc.), which access various virtual edge instances. Here, the virtual edge instances 1132, 1134 provide edge compute capabilities and processing in an edge cloud, with access to a cloud/data center 1140 for higher-latency requests for websites, applications, database servers, etc. However, the edge cloud enables coordination of processing among multiple edge nodes for multiple tenants or entities.

In the example of FIG. 11, these virtual edge instances include: a first virtual edge 1132, offered to a first tenant (Tenant 1), which offers a first combination of edge storage, computing, and services; and a second virtual edge 1134, offering a second combination of edge storage, computing, and services. The virtual edge instances 1132, 1134 are distributed among the edge nodes 1122, 1124, and may include scenarios in which a request and response are fulfilled from the same or different edge nodes. The configuration of the edge nodes 1122, 1124 to operate in a distributed yet coordinated fashion occurs based on edge provisioning functions 1150. The functionality of the edge nodes 1122, 1124 to provide coordinated operation for applications and services, among multiple tenants, occurs based on orchestration functions 1160.

It should be understood that some of the devices in 1110 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1122, 1124 may operate as security feature enforcement points for local resources allocated to multiple tenants per node. Additionally, tenant runtime and application execution (e.g., in instances 1132, 1134) may serve as an enforcement point for a security feature that creates a virtual edge abstraction of resources spanning potentially multiple physical hosting platforms. Finally, the orchestration functions 1160 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1110, 1122, and 1140 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 11. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1122, 1124 may implement the use of containers, such as with the use of a container "pod" 1126, 1128 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1132, 1134 are partitioned according to the needs of each container.

With the use of container pods, a pod controller oversees the partitioning and allocation of containers and resources. The pod controller receives instructions from an orchestrator (e.g., orchestrator 1160) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1160 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 12:
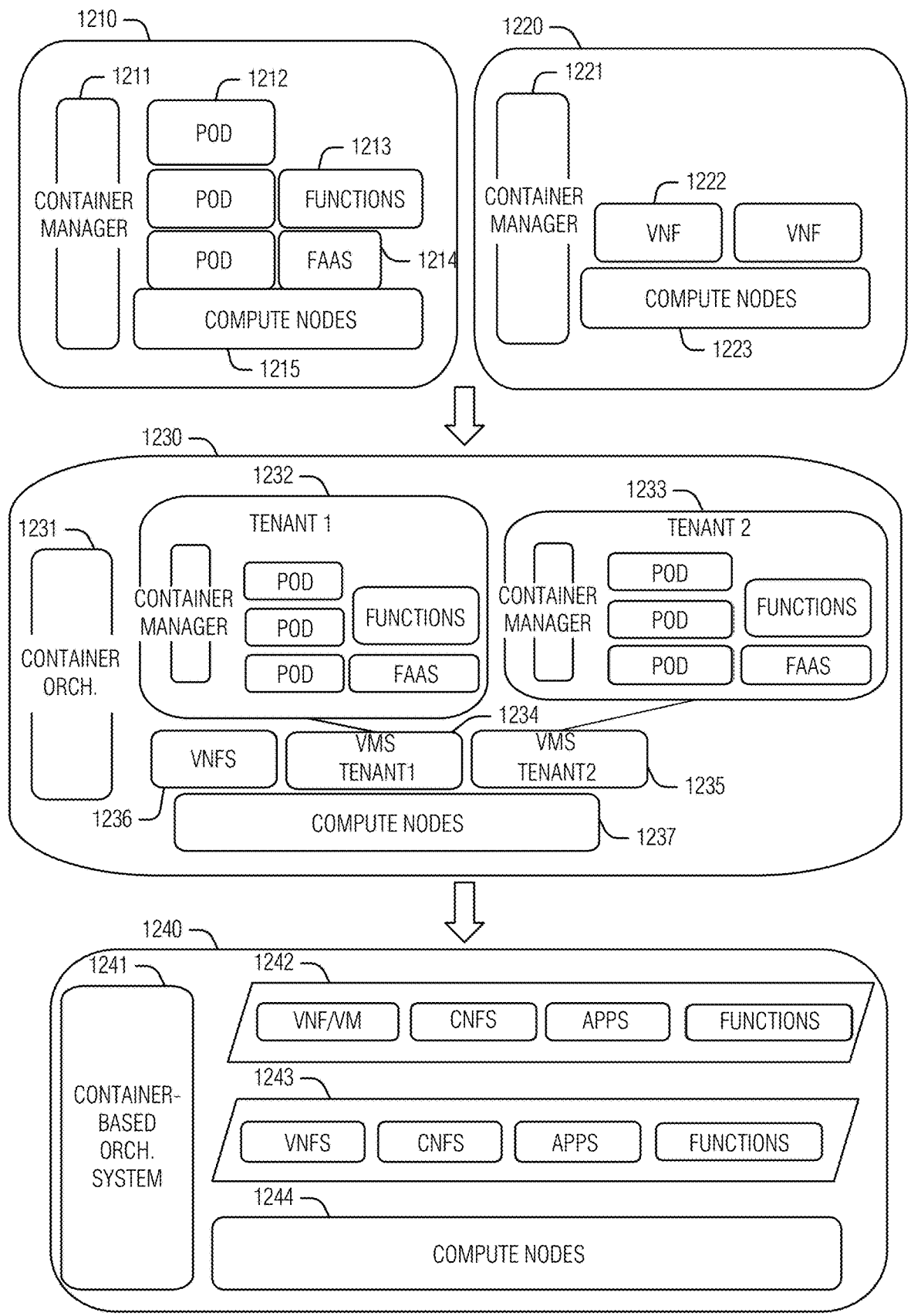
FIG. 12 illustrates various compute arrangements deploying containers in an edge computing system.

FIG. 12 illustrates additional compute arrangements deploying containers in an edge computing system. As a simplified example, system arrangements 1210, 1220 depict settings in which a pod controller (e.g., container managers 1211, 1221, and container orchestrator 1231) is adapted to launch containerized pods, functions, and functions-as-a-service instances through execution via compute nodes (1215 in arrangement 1210), or to separately execute containerized virtualized network functions through execution via compute nodes (1223 in arrangement 1220). This arrangement is adapted for use of multiple tenants in system arrangement 1230 (using compute nodes 1237), where containerized pods (e.g., pods 1212), functions (e.g., functions 1213, VNFs 1222, 1236), and functions-as-a-service instances (e.g., FaaS instance 1214) are launched within virtual machines (e.g., VMs 1234, 1235 for tenants 1232, 1233) specific to respective tenants (aside the execution of virtualized network functions). This arrangement is further adapted for use in system arrangement 1240, which provides containers 1242, 1243, or execution of the various functions, applications, and functions on compute nodes 1244, as coordinated by an container-based orchestration system 1241.

The system arrangements of depicted in FIG. 12 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 12, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further examples, any of the compute nodes or devices discussed with reference to the present edge computing systems and environment may be fulfilled based on the components depicted in FIGS. 13A and 13B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 13A:
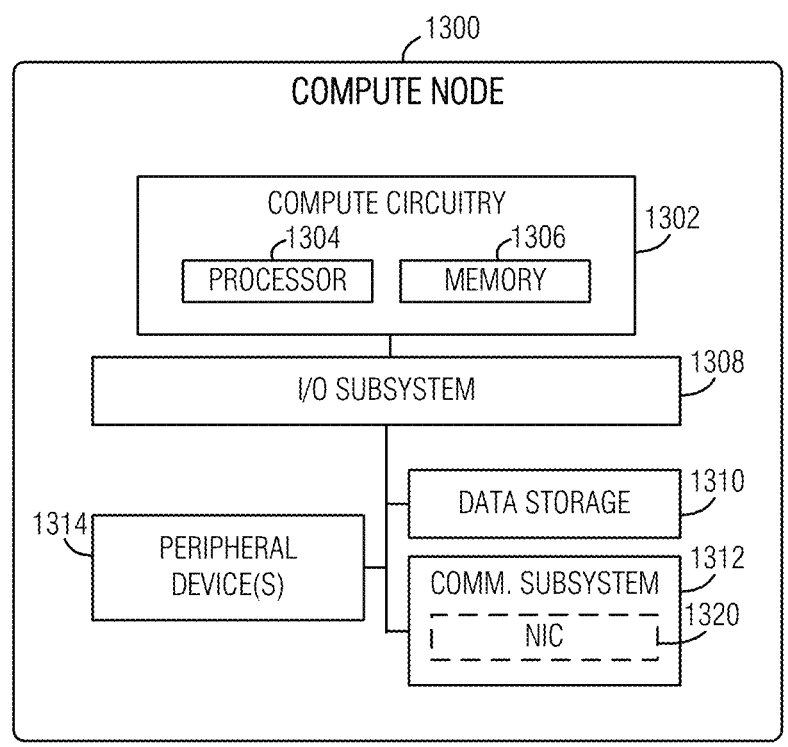
FIG. 13A provides an overview of example components for compute deployed at a compute node in an edge computing system.

In the simplified example depicted in FIG. 13A, an edge compute node 1300 includes a compute engine (also referred to herein as "compute circuitry") 1302, an input/output (I/O) subsystem 1308, data storage 1310, a communication circuitry subsystem 1312, and, optionally, one or more peripheral devices 1314. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1300 may be embodied as any type of engine, device, or collection of devices capable of performing various compute functions. In some examples, the compute node 1300 may be embodied as a single device such as an integrated circuit, an embedded system, a field-programmable gate array (FPGA), a system-on-a-chip (SOC), or other integrated system or device. In the illustrative example, the compute node 1300 includes or is embodied as a processor 1304 and a memory 1306. The processor 1304 may be embodied as any type of processor capable of performing the functions described herein (e.g., executing an application). For example, the processor 1304 may be embodied as a multi-core processor(s), a microcontroller, a processing unit, a specialized or special purpose processing unit, or other processor or processing/controlling circuit.

In some examples, the processor 1304 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1304 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1304 may work in coordination with each other to execute many types of operations and instructions within and on behalf of the compute node 1300.

The memory 1306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1306 may be integrated into the processor 1304. The memory 1306 may store various software and data used during operation such as one or more applications, data operated on by the application(s), libraries, and drivers.

The compute circuitry 1302 is communicatively coupled to other components of the compute node 1300 via the I/O subsystem 1308, which may be embodied as circuitry or components to facilitate input/output operations with the compute circuitry 1302 (e.g., with the processor 1304 or the main memory 1306) and other components of the compute circuitry 1302. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 1308 may form a portion of a system-on-a-chip (SoC) and be incorporated, along with one or more of the processor 1304, the memory 1306, and other components of the compute circuitry 1302, into the compute circuitry 1302.

The one or more illustrative data storage devices 1310 may be embodied as any type of devices configured for short-term or long-term storage of data such as, for example, memory devices and circuits, memory cards, hard disk drives, solid-state drives, or other data storage devices. Individual data storage devices 1310 may include a system partition that stores data and firmware code for the data storage device 1310. Individual data storage devices 1310 may also include one or more operating system partitions that store data files and executables for operating systems depending on, for example, the type of compute node 1300.

The communication circuitry 1312 may be embodied as any communication circuit, device, or collection thereof, capable of enabling communications over a network between the compute circuitry 1302 and another compute device (e.g., an edge gateway of an implementing edge computing system). The communication circuitry 1312 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1312 includes a network interface controller (NIC) 1320, which may also be referred to as a host fabric interface (HFI). The NIC 1320 may be embodied as one or more add-in-boards, daughter cards, network interface cards, controller chips, chipsets, or other devices that may be used by the compute node 1300 to connect with another compute device (e.g., an edge gateway node). In some examples, the NIC 1320 may be embodied as part of a system-on-a-chip (SoC) that includes one or more processors, or included on a multichip package that also contains one or more processors. In some examples, the NIC 1320 may include a local processor (not shown) or a local memory (not shown) that are both local to the NIC 1320. In such examples, the local processor of the NIC 1320 may be capable of performing one or more of the functions of the compute circuitry 1302 described herein. Additionally, or alternatively, in such examples, the local memory of the NIC 1320 may be integrated into one or more components of the client compute node at the board level, socket level, chip level, or other levels.

Additionally, in some examples, a respective compute node 1300 may include one or more peripheral devices 1314. Such peripheral devices 1314 may include any type of peripheral device found in a compute device or server such as audio input devices, a display, other input/output devices, interface devices, or other peripheral devices, depending on the particular type of the compute node 1300. In further examples, the compute node 1300 may be embodied by a respective edge compute node (whether a client, gateway, or aggregation node) in an edge computing system or like forms of appliances, computers, subsystems, circuitry, or other components.

Figure 13B:
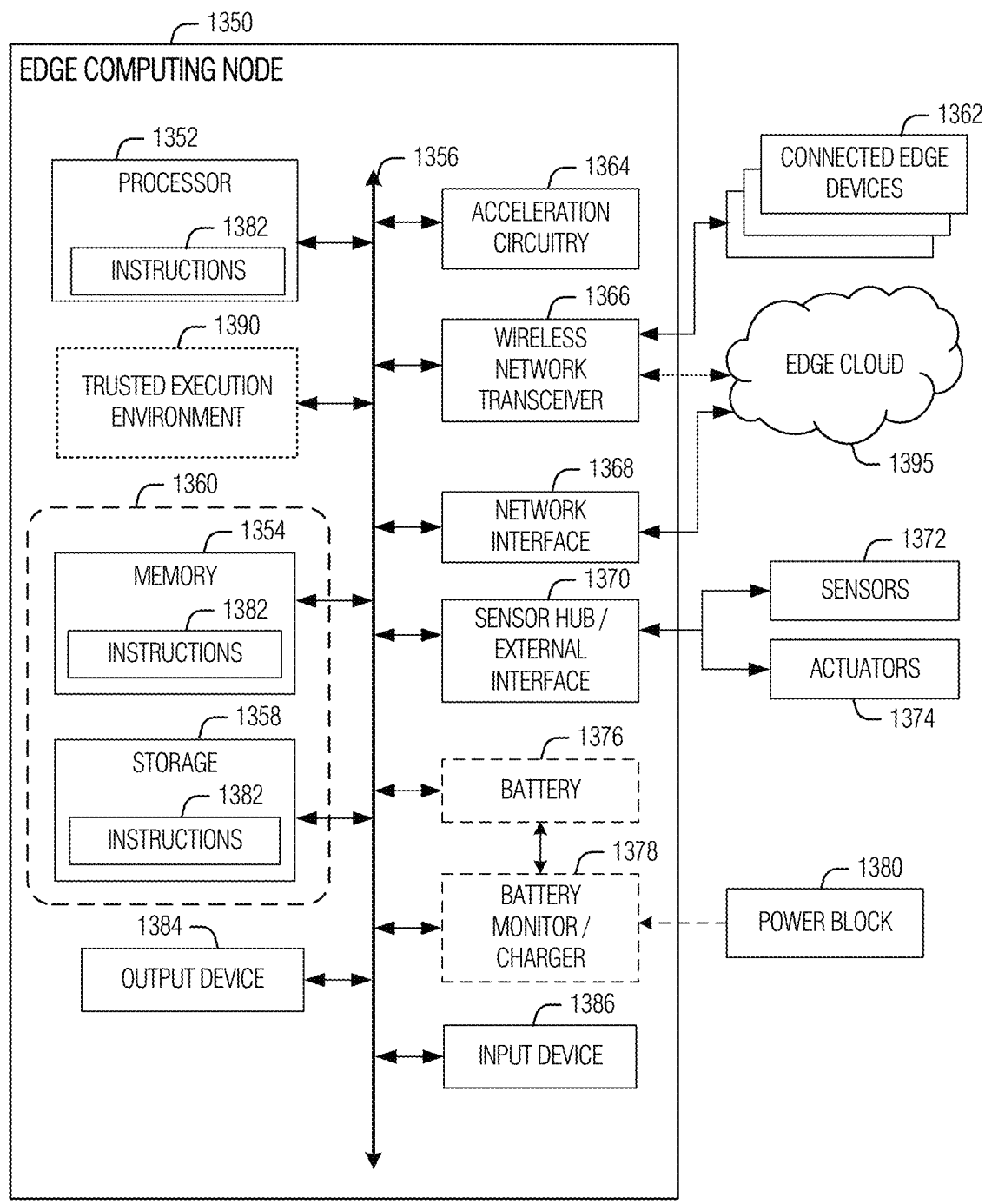
FIG. 13B provides a further overview of example components within a computing device in an edge computing system.

In a more detailed example, FIG. 13B illustrates a block diagram of an example of components that may be present in an edge computing node 1350 for implementing the techniques (e.g., operations, processes, methods, and methodologies) described herein. This edge computing node 1350 provides a closer view of the respective components of node 1300 when implemented as or as part of a computing device (e.g., as a mobile device, a base station, server, gateway, etc.). The edge computing node 1350 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1350, or as components otherwise incorporated within a chassis of a larger system.

The edge computing device 1350 may include processing circuitry in the form of a processor 1352, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1352 may be a part of a system on a chip (SoC) in which the processor 1352 and other components are formed into a single integrated circuit, or a single package, such as the Edison™ or Galileo™ SoC boards from Intel Corporation, Santa Clara, California As an example, the processor 1352 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1352 and accompanying circuitry may be provided in a single socket form factor, multiple socket form factor, or a variety of other formats, including in limited hardware configurations or configurations that include fewer than all elements shown in FIG. 13B.

The processor 1352 may communicate with a system memory 1354 over an interconnect 1356 (e.g., a bus). Any number of memory devices may be used to provide for a given amount of system memory. As examples, the memory 1354 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example, the storage 1358 may be implemented via a solid-state disk drive (SSDD). Other devices that may be used for the storage 1358 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1356 may couple the processor 1352 to a transceiver 1366, for communications with the connected edge devices 1362. The transceiver 1366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1366 (or multiple transceivers) may communicate using multiple standards or radios for communications at a different range. For example, the edge computing node 1350 may communicate with close devices, e.g., within about 10 meters, using a local transceiver based on Bluetooth Low Energy (BLE), or another low power radio, to save power. More distant connected edge devices 1362, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1366 (e.g., a radio transceiver) may be included to communicate with devices or services in a cloud (e.g., an edge cloud 1395) via local or wide area network protocols. The wireless network transceiver 1366 may be a low-power wide-area (LPWA) transceiver that follows the IEEE 802.15.4, or IEEE 802.15.4g standards, among others. The edge computing node 1350 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1366, as described herein. For example, the transceiver 1366 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1366 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1368 may be included to provide a wired communication to nodes of the edge cloud 1395 or to other devices, such as the connected edge devices 1362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to enable connecting to a second network, for example, a first NIC 1368 providing communications to the cloud over Ethernet, and a second NIC 1368 providing communications to other devices over another type of network.

Given the variety of types of applicable communications from the device to another component or network, applicable communications circuitry used by the device may include or be embodied by any one or more of components 1364, 1366, 1368, or 1370. Accordingly, in various examples, applicable means for communicating (e.g., receiving, transmitting, etc.) may be embodied by such communications circuitry.

The edge computing node 1350 may include or be coupled to acceleration circuitry 1364, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1356 may couple the processor 1352 to a sensor hub or external interface 1370 that is used to connect additional devices or subsystems. The devices may include sensors 1372, such as accelerometers, level sensors, flow sensors, optical light sensors, camera sensors, temperature sensors, global navigation system (e.g., GPS) sensors, pressure sensors, barometric pressure sensors, and the like. The hub or interface 1370 further may be used to connect the edge computing node 1350 to actuators 1374, such as power switches, valve actuators, an audible sound generator, a visual warning device, and the like.

In some optional examples, various input/output (I/O) devices may be present within or connected to, the edge computing node 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1350. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1376 may power the edge computing node 1350, although, in examples in which the edge computing node 1350 is mounted in a fixed location, it may have a power supply coupled to an electrical grid, or the battery may be used as a backup or for temporary capabilities. The battery 1376 may be a lithium ion battery, or a metal-air battery, such as a zinc-air battery, an aluminum-air battery, a lithium-air battery, and the like.

A battery monitor/charger 1378 may be included in the edge computing node 1350 to track the state of charge (SoCh) of the battery 1376, if included. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1378 may communicate the information on the battery 1376 to the processor 1352 over the interconnect 1356. The battery monitor/charger 1378 may also include an analog-to-digital (ADC) converter that enables the processor 1352 to directly monitor the voltage of the battery 1376 or the current flow from the battery 1376. The battery parameters may be used to determine actions that the edge computing node 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the edge computing node 1350. A wireless battery charging circuit, such as an LTC4020 chip from Linear Technologies of Milpitas, California, among others, may be included in the battery monitor/charger 1378. The specific charging circuits may be selected based on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine-readable medium 1360 including code to direct the processor 1352 to perform electronic operations in the edge computing node 1350. The processor 1352 may access the non-transitory, machine-readable medium 1360 over the interconnect 1356. For instance, the non-transitory, machine-readable medium 1360 may be embodied by devices described for the storage 1358 or may include specific storage units such as optical disks, flash drives, or any number of other hardware devices. The non-transitory, machine-readable medium 1360 may include instructions to direct the processor 1352 to perform a specific sequence or flow of actions, for example, as described with respect to the flowchart(s) and block diagram(s) of operations and functionality depicted above. As used herein, the terms "machine-readable medium" and "computer-readable medium" are interchangeable. Also in a specific example, the instructions 1382 on the processor 1352 (separately, or in combination with the instructions 1382 of the machine readable medium 1360) may configure execution or operation of a trusted execution environment (TEE) 1390. In an example, the TEE 1390 operates as a protected area accessible to the processor 1352 for secure execution of instructions and secure access to data. Various implementations of the TEE 1390, and an accompanying secure area in the processor 1352 or the memory 1354 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1350 through the TEE 1390 and the processor 1352.

Figure 14:
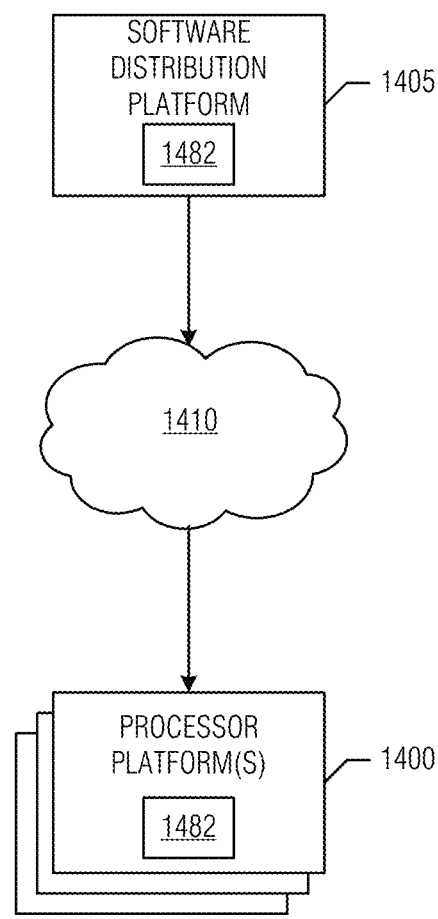
FIG. 14 illustrates an example software distribution platform to distribute software.

FIG. 14 illustrates an example software distribution platform 1405 to distribute software, such as the example computer readable instructions 1482 of FIG. 14, to one or more devices, such as example processor platform(s) 1400 or connected edge devices. The example software distribution platform 1405 may be implemented by any computer server, data facility, cloud service, etc., capable of storing and transmitting software to other computing devices (e.g., third parties, or connected edge devices). Example connected edge devices may be customers, clients, managing devices (e.g., servers), third parties (e.g., customers of an entity owning or operating the software distribution platform 1405). Example connected edge devices may operate in commercial or home automation environments. In some examples, a third party is a developer, a seller, or a licensor of software such as the example computer readable instructions 1482 of FIG. 14. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected edge devices) geographically or logically separated from each other (e.g., physically separated IoT devices chartered with the responsibility of water distribution control (e.g., pumps), electricity distribution control (e.g., relays), etc.).

In the illustrated example of FIG. 14, the software distribution platform 1405 includes one or more servers and one or more storage devices. The storage devices store the computer readable instructions 1482, which may correspond to the example computer readable instructions illustrated in the figures and described herein. The one or more servers of the example software distribution platform 1405 are in communication with a network 1410, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 1482 from the software distribution platform 1405. For example, the software, which may correspond to the example computer readable instructions described herein, may be downloaded to the example processor platform(s) 1400 (e.g., example connected edge devices), which are to execute the computer readable instructions 1482 to implement the technique. In some examples, one or more servers of the software distribution platform 1405 are communicatively connected to one or more security domains or security devices through which requests and transmissions of the example computer readable instructions 1482 must pass. In some examples, one or more servers of the software distribution platform 1405 periodically offer, transmit, or force updates to the software (e.g., the example computer readable instructions 1482 of FIG. 14) to ensure improvements, patches, updates, etc. are distributed and applied to the software at the end user devices.

In the illustrated example of FIG. 14, the computer readable instructions 1482 are stored on storage devices of the software distribution platform 1405 in a particular format. A format of computer readable instructions includes, but is not limited to a particular code language (e.g., Java, JavaScript, Python, C, C#, SQL, HTML, etc.), or a particular code state (e.g., uncompiled code (e.g., ASCII), interpreted code, linked code, executable code (e.g., a binary), etc.). In some examples, the computer readable instructions 1482 stored in the software distribution platform 1405 are in a first format when transmitted to the example processor platform(s) 1400. In some examples, the first format is an executable binary in which particular types of the processor platform(s) 1400 can execute. However, in some examples, the first format is uncompiled code that requires one or more preparation tasks to transform the first format to a second format to enable execution on the example processor platform(s) 1400. For instance, the receiving processor platform(s) 1400 may need to compile the computer readable instructions 1482 in the first format to generate executable code in a second format that is capable of being executed on the processor platform(s) 1400. In still other examples, the first format is interpreted code that, upon reaching the processor platform(s) 1400, is interpreted by an interpreter to facilitate execution of instructions.

FIG. 15 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1505 (e.g., subscriber) requests named content from the network itself. The content request may be called an interest and transmitted via an interest packet 1530. As the interest packet traverses network devices (e.g., network elements, routers, switches, hubs, etc.)—such as network elements 1510, 1515, and 1520—a record of the interest is kept, for example, in a pending interest table (PIT) at each network element. Thus, network element 1510 maintains an entry in its PIT 1535 for the interest packet 1530, network element 1515 maintains the entry in its PIT, and network element 1520 maintains the entry in its PIT.

When a device, such as publisher 1540, that has content matching the name in the interest packet 1530 is encountered, that device 1540 may send a data packet 1545 in response to the interest packet 1530. Typically, the data packet 1545 is tracked back through the network to the source (e.g., device 1505) by following the traces of the interest packet 1530 left in the network element PITs. Thus, the PIT 1535 at each network element establishes a trail back to the subscriber 1505 for the data packet 1545 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1530 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 1530 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1530 to data cached in the ICN element. Thus, for example, if the data 1545 named in the interest 1530 is cached in network element 1515, then the network element 1515 will return the data 1545 to the subscriber 1505 via the network element 1510. However, if the data 1545 is not cached at network element 1515, the network element 1515 routes the interest 1530 on (e.g., to network element 1520). To facilitate routing, the network elements may use a forwarding information base 1525 (FIB) to match named data to an interface (e.g., physical port) for the route. Thus, the FIB 1525 operates much like a routing table on a traditional network device.

In an example, additional metadata may be attached to the interest packet 1530, the cached data, or the route (e.g., in the FIB 1525), to provide an additional level of matching. For example, the data name may be specified as "www.somedomain.com or videos or v8675309," but also include a version number—or timestamp, time range, endorsement, etc. In this example, the interest packet 1530 may specify the desired name, the version number, or the version range. The matching may then locate routes or cached data matching the name and perform the additional comparison of metadata or the like to arrive at an ultimate decision as to whether data or a route matches the interest packet 1530 for respectively responding to the interest packet 1530 with the data packet 1545 or forwarding the interest packet 1530.

ICN has advantages over host-based networking because the data segments are individually named. This enables aggressive caching throughout the network as a network element may provide a data packet 1530 in response to an interest 1530 as easily as an original author 1540. Accordingly, it is less likely that the same segment of the network will transmit duplicates of the same data requested by different devices.

Fine grained encryption is another feature of many ICN networks. A typical data packet 1545 includes a name for the data that matches the name in the interest packet 1530. Further, the data packet 1545 includes the requested data and may include additional information to filter similarly named data (e.g., by creation time, expiration time, version, etc.). To address malicious entities providing false information under the same name, the data packet 1545 may also encrypt its contents with a publisher key or provide a cryptographic hash of the data and the name. Thus, knowing the key (e.g., from a certificate of an expected publisher 1540) enables the recipient to ascertain whether the data is from that publisher 1540. This technique also facilitates the aggressive caching of the data packets 1545 throughout the network because each data packet 1545 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 16:
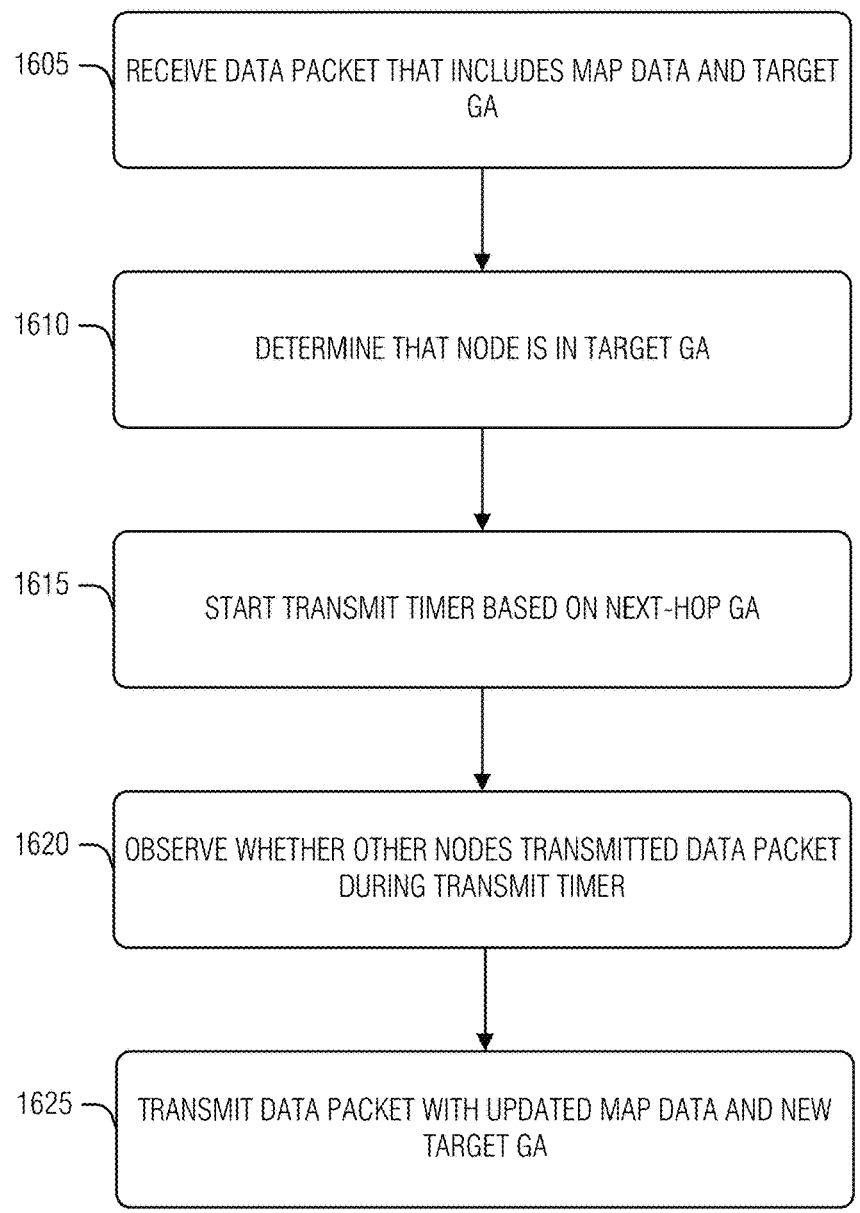
FIG. 16 illustrates a flow diagram of an example of a method for ICN tunneling, according to an embodiment.

FIG. 16 illustrates a flow diagram of an example of a method 1600 for geographic routing, according to an embodiment. The operations of the method 1600 are performed by computational hardware, such as that described above or below (e.g., processing circuitry).

At operation 1605, a node receives a data packet. Here, the data packet includes map data, a sequence of geographic areas to a requestor, and a target geographic area. In an example, the node updates local map data with the map data from the data packet.

In an example, geographic areas have a predefined addressing. In an example, the addressing is arranged in a grid in a two-dimensional plane, an address including a first identifier for a row and a second identifier for a column in the grid. In an example, the address includes a third indicator for a layer, the layer being another two dimensional at a different altitude. In an example, cells of the grid are sized based on a radio frequency environment for the cell. In an example, the cells are sized such that a transmission from a first cell will reach the entirety of a neighbor cell under normal conditions.

At operation 1610, it is determined that the node is within the target geographic area.

At operation 1615, a transmit timer based on a next-hop geographic area is started. Here, the next-hop geographic area determined from the sequence of geographic areas in the data packet. In an example, starting the transmit timer based on a next-hop geographic area includes calculating a geographic component of time based on a proximity of the node to the next-hop geographic area. Here, the geographic component of time is smaller when the node is closer to the next-hop geographic area.

In an example, calculating the geographic component of time includes determining a first vector (e.g., $v_{fwd(i)}$) from a center of the target geographic area to a center of the next-hop geographic area and determining a second vector (e.g., $v_{fwd^2(i)}$) from the center of the next-hop geographic area towards a center of a next-two-hop geographic area.

Then, the first vector and the second vector are summed to produce a third vector (e.g., suggested forwarding direction or $v_{sugg\_fwd}$).

Once the third vector is determined, a fourth vector (e.g., $v_k$) from the center of the target geographic area to the node is determined. The fourth vector is projected onto the third vector to produce a fifth vector (e.g., the projection 555 illustrated in FIG. 5). Here, the geographic component of time based on a magnitude of the fifth vector. In an example, the second vector has a length equal to a distance between the center of the next-hop geographic area and the center of a next-two-hop geographic area reduced (e.g., vector $\alpha v_{fwd}^2{}_{(i)}$ illustrated as vector 535 in FIG. 5). In an example, the transmit timer includes a random component combined with the geographic component.

At operation 1620, during the transit timer, a number of data packets received from the target geographic area that match to the data packet are counted to determine that the number of data packets is less than a predefined threshold.

At operation 1625, a modified data packet is transmitted in response to expiration of the transit timer and the number of data packets is less than the predefined, the modified data packet being the data packet modified such that the map data is updated with map data from the node for the target geographic area and the target geographic area is by the next-hop geographic area to specify a new target geographic area.

In an example, the data packet is in response to an interest packet originating from the requestor, the interest packet specifying a request by the requestor. In an example, the data packet is one of two types, the first type including a response to the request, and the second type does not include a response to the request. In an example, when the data packet is of the second type, and the modified data packet includes an aggregation of map data from data packets of the second type received over a predefined period of time.

In an example, the operations of method 1600 include receiving the interest packet. Here, the interest packet including the sequence of geographic areas to the requestor. The operations continue by starting a random timer and counting—during the random timer—a number of interest packets received from the target geographic area that match the interest packet to determine that a number of interest packets is less than a second predefined threshold. Then, the node may transmit a modified interest packet in response to expiration of the random timer and the number of interest packets is less that the second predefined threshold. Here, the modified interest is the interest packet that is modified such that the target geographic area is added to the sequence of geographic areas back to the requestor. In an example, the node updates local map data the map data in the interest packet.

Figure 17:
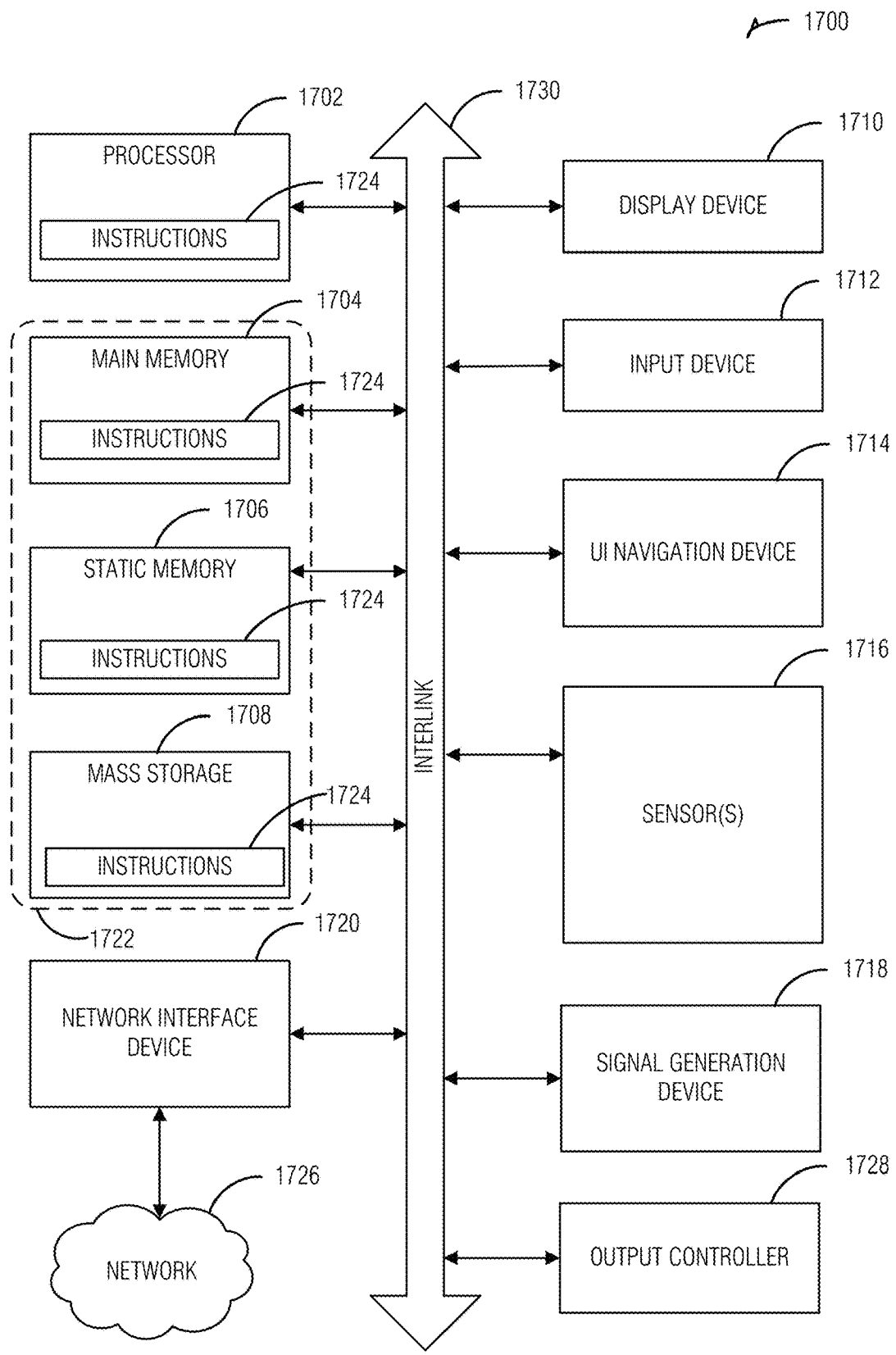
FIG. 17 is a block diagram illustrating an example of a machine upon which one or more embodiments may be implemented.

FIG. 17 illustrates a block diagram of an example machine 1700 upon which any one or more of the techniques (e.g., methodologies) discussed herein may perform. Examples, as described herein, may include, or may operate by, logic or a number of components, or mechanisms in the machine 1700. Circuitry (e.g., processing circuitry) is a collection of circuits implemented in tangible entities of the machine 1700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1700 follow.

In alternative embodiments, the machine 1700 may operate as a standalone device or may be connected (e.g., networked) to other machines. In a networked deployment, the machine 1700 may operate in the capacity of a server machine, a client machine, or both in server-client network environments. In an example, the machine 1700 may act as a peer machine in peer-to-peer (P2P) (or other distributed) network environment. The machine 1700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1700 may include a hardware processor 1702 (e.g., a central processing unit (CPU), a graphics processing unit (GPU), a hardware processor core, or any combination thereof), a main memory 1704, a static memory (e.g., memory or storage for firmware, microcode, a basic-input-output (BIOS), unified extensible firmware interface (UEFI), etc.) 1706, and mass storage 1708 (e.g., hard drives, tape drives, flash storage, or other block devices) some or all of which may communicate with each other via an interlink (e.g., bus) 1730. The machine 1700 may further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1708, a signal generation device 1718 (e.g., a speaker), a network interface device 1720, and one or more sensors 1716, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1702, the main memory 1704, the static memory 1706, or the mass storage 1708 may be, or include, a machine readable medium 1722 on which is stored one or more sets of data structures or instructions 1724 (e.g., software) embodying or utilized by any one or more of the techniques or functions described herein. The instructions 1724 may also reside, completely or at least partially, within any of registers of the processor 1702, the main memory 1704, the static memory 1706, or the mass storage 1708 during execution thereof by the machine 1700. In an example, one or any combination of the hardware processor 1702, the main memory 1704, the static memory 1706, or the mass storage 1708 may constitute the machine readable media 1722. While the machine readable medium 1722 is illustrated as a single medium, the term "machine readable medium" may include a single medium or multiple media (e.g., a centralized or distributed database, or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1722 may be representative of the instructions 1724, such as instructions 1724 themselves or a format from which the instructions 1724 may be derived. This format from which the instructions 1724 may be derived may include source code, encoded instructions (e.g., in compressed or encrypted form), packaged instructions (e.g., split into multiple packages), or the like. The information representative of the instructions 1724 in the machine readable medium 1722 may be processed by processing circuitry into the instructions to implement any of the operations discussed herein. For example, deriving the instructions 1724 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1724.

In an example, the derivation of the instructions 1724 may include assembly, compilation, or interpretation of the information (e.g., by the processing circuitry) to create the instructions 1724 from some intermediate or preprocessed format provided by the machine readable medium 1722. The information, when provided in multiple parts, may be combined, unpacked, and modified to create the instructions 1724. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1724 may be further transmitted or received over a communications network 1726 using a transmission medium via the network interface device 1720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1700, and includes digital or analog communications signals or other intangible medium to facilitate communication of such software. A transmission medium is a machine readable medium.

Additional Notes & Examples

Example 1 is a device for geographic routing, the device comprising: a memory including instructions; and processing circuitry that, when in operation, is configured by the instructions to: receive, at a node, a data packet, the data packet including map data, a sequence of geographic areas to a requestor, and a target geographic area; determine that the node is within the target geographic area; start a transmit timer based on a next-hop geographic area, the next-hop geographic area determined from the sequence of geographic areas in the data packet; count, during the transmit timer, a number of data packets received from the target geographic area that match to the data packet to determine that the number of data packets is less than a predefined threshold; and transmit a modified data packet in response to expiration of the transmit timer and the number of data packets is less than the predefined threshold, the modified data packet being the data packet modified such that the map data is updated with map data from the node for the target geographic area and the target geographic area is by the next-hop geographic area to specify a new target geographic area.

In Example 2, the subject matter of Example 1, wherein the instructions configure the processing circuitry to update the map data from the node with the map data of the data packet.

In Example 3, the subject matter of any of Examples 1-2, wherein the data packet is in response to an interest packet originating from the requestor, the interest packet specifying a request by the requestor.

In Example 4, the subject matter of Example 3, wherein the data packet is one of two types, a first type including a response to the request, and a second type does not include a response to the request.

In Example 5, the subject matter of Example 4, wherein the data packet is of the second type, and wherein the modified data packet includes an aggregation of map data from data packets of the second type received over a predefined period of time.

In Example 6, the subject matter of any of Examples 3-5, wherein the instructions configure the processing circuitry to: receive the interest packet, the interest packet including the sequence of geographic areas to the requestor; start a random timer; count, during the random timer, a number of interest packets received from the target geographic area that match the interest packet to determine that a number of interest packets is less than a second predefined threshold; and transmit a modified interest packet in response to expiration of the random timer and the number of interest packets is less that the second predefined threshold, the modified interest being the interest packet modified such that the target geographic area is added to the sequence of geographic areas back to the requestor.

In Example 7, the subject matter of Example 6, wherein the instructions configure the processing circuitry to update map data of the node with the map data in the interest packet.

In Example 8, the subject matter of any of Examples 1-7, wherein geographic areas have a predefined addressing.

In Example 9, the subject matter of any of Examples 1-8, wherein an address is arranged in a grid in a two-dimensional plane, the address include a first identifier for a row and a second identifier for a column in the grid.

In Example 10, the subject matter of Example 9, wherein cells of the grid are sized based on a radio frequency environment for the cell.

In Example 11, the subject matter of Example 10, wherein the cells are sized such that a transmission from a first cell will reach an entirety of a neighbor cell under normal conditions.

In Example 12, the subject matter of any of Examples 9-11, wherein the address includes a third indicator for a layer, the layer being another two dimensional at a different altitude.

In Example 13, the subject matter of any of Examples 1-12, wherein, to start the transmit timer based on a next-hop geographic area, the processing circuitry calculates a geographic component of time based on a proximity of the node to the next-hop geographic area, wherein the geographic component of time is smaller when the node is closer to the next-hop geographic area.

In Example 14, the subject matter of Example 13, wherein, to calculate the geographic component of time, the processing circuitry: determines a first vector from a center of the target geographic area to a center of the next-hop geographic area; determines a second vector from the center of the next-hop geographic area towards a center of a next-two-hop geographic area; adds the first vector and the second vector to produce a third vector; determines a fourth vector from the center of the target geographic area to the node; projects the fourth vector onto the third vector to produce a fifth vector; and sets the geographic component of time based on a magnitude of the fifth vector.

In Example 15, the subject matter of Example 14, wherein the second vector has a length equal to a distance between the center of the next-hop geographic area and the center of a next-two-hop geographic area reduced.

In Example 16, the subject matter of any of Examples 13-15, wherein the transmit timer includes a random component combined with the geographic component.

Example 17 is a method for geographic routing, the method comprising: receiving, at a node, a data packet, the data packet including map data, a sequence of geographic areas to a requestor, and a target geographic area; determining that the node is within the target geographic area; starting a transmit timer based on a next-hop geographic area, the next-hop geographic area determined from the sequence of geographic areas in the data packet; counting, during the transmit timer, a number of data packets received from the target geographic area that match to the data packet to determine that the number of data packets is less than a predefined threshold; and transmitting a modified data packet in response to expiration of the transmit timer and the number of data packets is less than the predefined threshold, the modified data packet being the data packet modified such that the map data is updated with map data from the node for the target geographic area and the target geographic area is by the next-hop geographic area to specify a new target geographic area.

In Example 18, the subject matter of Example 17, comprising updating the map data from the node with the map data of the data packet.

In Example 19, the subject matter of any of Examples 17-18, wherein the data packet is in response to an interest packet originating from the requestor, the interest packet specifying a request by the requestor.

In Example 20, the subject matter of Example 19, wherein the data packet is one of two types, a first type including a response to the request, and a second type does not include a response to the request.

In Example 21, the subject matter of Example 20, wherein the data packet is of the second type, and wherein the modified data packet includes an aggregation of map data from data packets of the second type received over a predefined period of time.

In Example 22, the subject matter of any of Examples 19-21, comprising: receiving the interest packet, the interest packet including the sequence of geographic areas to the requestor; starting a random timer; counting, during the random timer, a number of interest packets received from the target geographic area that match the interest packet to determine that a number of interest packets is less than a second predefined threshold; and transmitting a modified interest packet in response to expiration of the random timer and the number of interest packets is less that the second predefined threshold, the modified interest being the interest packet modified such that the target geographic area is added to the sequence of geographic areas back to the requestor.

In Example 23, the subject matter of Example 22, comprising updating map data of the node with the map data in the interest packet.

In Example 24, the subject matter of any of Examples 17-23, wherein geographic areas have a predefined addressing.

In Example 25, the subject matter of any of Examples 17-24, wherein an address is arranged in a grid in a two-dimensional plane, the address include a first identifier for a row and a second identifier for a column in the grid.

In Example 26, the subject matter of Example 25, wherein cells of the grid are sized based on a radio frequency environment for the cell.

In Example 27, the subject matter of Example 26, wherein the cells are sized such that a transmission from a first cell will reach an entirety of a neighbor cell under normal conditions.

In Example 28, the subject matter of any of Examples 25-27, wherein the address includes a third indicator for a layer, the layer being another two dimensional at a different altitude.

In Example 29, the subject matter of any of Examples 17-28, wherein starting the transmit timer based on a next-hop geographic area includes calculating a geographic component of time based on a proximity of the node to the next-hop geographic area, wherein the geographic component of time is smaller when the node is closer to the next-hop geographic area.

In Example 30, the subject matter of Example 29, wherein calculating the geographic component of time includes: determining a first vector from a center of the target geographic area to a center of the next-hop geographic area; determining a second vector from the center of the next-hop geographic area towards a center of a next-two-hop geographic area; adding the first vector and the second vector to produce a third vector; determining a fourth vector from the center of the target geographic area to the node; projecting the fourth vector onto the third vector to produce a fifth vector; and setting the geographic component of time based on a magnitude of the fifth vector.

In Example 31, the subject matter of Example 30, wherein the second vector has a length equal to a distance between the center of the next-hop geographic area and the center of a next-two-hop geographic area reduced.

In Example 32, the subject matter of any of Examples 29-31, wherein the transmit timer includes a random component combined with the geographic component.

Example 33 is at least one machine readable medium including instructions for geographic routing, the instructions, when executed by processing circuitry, cause the processing circuitry to perform operations comprising: receiving, at a node, a data packet, the data packet including map data, a sequence of geographic areas to a requestor, and a target geographic area; determining that the node is within the target geographic area; starting a transmit timer based on a next-hop geographic area, the next-hop geographic area determined from the sequence of geographic areas in the data packet; counting, during the transmit timer, a number of data packets received from the target geographic area that match to the data packet to determine that the number of data packets is less than a predefined threshold; and transmitting a modified data packet in response to expiration of the transmit timer and the number of data packets is less than the predefined threshold, the modified data packet being the data packet modified such that the map data is updated with map data from the node for the target geographic area and the target geographic area is by the next-hop geographic area to specify a new target geographic area.

In Example 34, the subject matter of Example 33, wherein the operations comprise updating the map data from the node with the map data of the data packet.

In Example 35, the subject matter of any of Examples 33-34, wherein the data packet is in response to an interest packet originating from the requestor, the interest packet specifying a request by the requestor.

In Example 36, the subject matter of Example 35, wherein the data packet is one of two types, a first type including a response to the request, and a second type does not include a response to the request.

In Example 37, the subject matter of Example 36, wherein the data packet is of the second type, and wherein the modified data packet includes an aggregation of map data from data packets of the second type received over a predefined period of time.

In Example 38, the subject matter of any of Examples 35-37, wherein the operations comprise: receiving the interest packet, the interest packet including the sequence of geographic areas to the requestor; starting a random timer; counting, during the random timer, a number of interest packets received from the target geographic area that match the interest packet to determine that a number of interest packets is less than a second predefined threshold; and transmitting a modified interest packet in response to expiration of the random timer and the number of interest packets is less that the second predefined threshold, the modified interest being the interest packet modified such that the target geographic area is added to the sequence of geographic areas back to the requestor.

In Example 39, the subject matter of Example 38, wherein the operations comprise updating map data of the node with the map data in the interest packet.

In Example 40, the subject matter of any of Examples 33-39, wherein geographic areas have a predefined addressing.

In Example 41, the subject matter of any of Examples 33-40, wherein an address is arranged in a grid in a two-dimensional plane, the address include a first identifier for a row and a second identifier for a column in the grid.

In Example 42, the subject matter of Example 41, wherein cells of the grid are sized based on a radio frequency environment for the cell.

In Example 43, the subject matter of Example 42, wherein the cells are sized such that a transmission from a first cell will reach an entirety of a neighbor cell under normal conditions.

In Example 44, the subject matter of any of Examples 41-43, wherein the address includes a third indicator for a layer, the layer being another two dimensional at a different altitude.

In Example 45, the subject matter of any of Examples 33-44, wherein starting the transmit timer based on a next-hop geographic area includes calculating a geographic component of time based on a proximity of the node to the next-hop geographic area, wherein the geographic component of time is smaller when the node is closer to the next-hop geographic area.

In Example 46, the subject matter of Example 45, wherein calculating the geographic component of time includes: determining a first vector from a center of the target geographic area to a center of the next-hop geographic area; determining a second vector from the center of the next-hop geographic area towards a center of a next-two-hop geographic area; adding the first vector and the second vector to produce a third vector; determining a fourth vector from the center of the target geographic area to the node; projecting the fourth vector onto the third vector to produce a fifth vector; and setting the geographic component of time based on a magnitude of the fifth vector.

In Example 47, the subject matter of Example 46, wherein the second vector has a length equal to a distance between the center of the next-hop geographic area and the center of a next-two-hop geographic area reduced.

In Example 48, the subject matter of any of Examples 45-47, wherein the transmit timer includes a random component combined with the geographic component.

Example 49 is a system for geographic routing, the system comprising: means for receiving, at a node, a data packet, the data packet including map data, a sequence of geographic areas to a requestor, and a target geographic area; means for determining that the node is within the target geographic area; means for starting a transmit timer based on a next-hop geographic area, the next-hop geographic area determined from the sequence of geographic areas in the data packet; means for counting, during the transmit timer, a number of data packets received from the target geographic area that match to the data packet to determine that the number of data packets is less than a predefined threshold; and means for transmitting a modified data packet in response to expiration of the transmit timer and the number of data packets is less than the predefined threshold, the modified data packet being the data packet modified such that the map data is updated with map data from the node for the target geographic area and the target geographic area is by the next-hop geographic area to specify a new target geographic area.

In Example 50, the subject matter of Example 49, comprising means for updating the map data from the node with the map data of the data packet.

In Example 51, the subject matter of any of Examples 49-50, wherein the data packet is in response to an interest packet originating from the requestor, the interest packet specifying a request by the requestor.

In Example 52, the subject matter of Example 51, wherein the data packet is one of two types, a first type including a response to the request, and a second type does not include a response to the request.

In Example 53, the subject matter of Example 52, wherein the data packet is of the second type, and wherein the modified data packet includes an aggregation of map data from data packets of the second type received over a predefined period of time.

In Example 54, the subject matter of any of Examples 51-53, comprising: means for receiving the interest packet, the interest packet including the sequence of geographic areas to the requestor; means for starting a random timer; means for counting, during the random timer, a number of interest packets received from the target geographic area that match the interest packet to determine that a number of interest packets is less than a second predefined threshold; and means for transmitting a modified interest packet in response to expiration of the random timer and the number of interest packets is less that the second predefined threshold, the modified interest being the interest packet modified such that the target geographic area is added to the sequence of geographic areas back to the requestor.

In Example 55, the subject matter of Example 54, comprising means for updating map data of the node with the map data in the interest packet.

In Example 56, the subject matter of any of Examples 49-55, wherein geographic areas have a predefined addressing.

In Example 57, the subject matter of any of Examples 49-56, wherein an address is arranged in a grid in a two-dimensional plane, the address include a first identifier for a row and a second identifier for a column in the grid.

In Example 58, the subject matter of Example 57, wherein cells of the grid are sized based on a radio frequency environment for the cell.

In Example 59, the subject matter of Example 58, wherein the cells are sized such that a transmission from a first cell will reach an entirety of a neighbor cell under normal conditions.

In Example 60, the subject matter of any of Examples 57-59, wherein the address includes a third indicator for a layer, the layer being another two dimensional at a different altitude.

In Example 61, the subject matter of any of Examples 49-60, wherein starting the transmit timer based on a next-hop geographic area includes calculating a geographic component of time based on a proximity of the node to the next-hop geographic area, wherein the geographic component of time is smaller when the node is closer to the next-hop geographic area.

In Example 62, the subject matter of Example 61, wherein the means for calculating the geographic component of time include: means for determining a first vector from a center of the target geographic area to a center of the next-hop geographic area; means for determining a second vector from the center of the next-hop geographic area towards a center of a next-two-hop geographic area; means for adding the first vector and the second vector to produce a third vector; means for determining a fourth vector from the center of the target geographic area to the node; means for projecting the fourth vector onto the third vector to produce a fifth vector; and means for setting the geographic component of time based on a magnitude of the fifth vector.

In Example 63, the subject matter of Example 62, wherein the second vector has a length equal to a distance between the center of the next-hop geographic area and the center of a next-two-hop geographic area reduced.

In Example 64, the subject matter of any of Examples 61-63, wherein the transmit timer includes a random component combined with the geographic component.

PNUM Example 65 is at least one machine-readable medium including instructions that, when executed by processing circuitry, cause the processing circuitry to perform operations to implement of any of Examples 1-64.

PNUM Example 66 is an apparatus comprising means to implement of any of Examples 1-64.

PNUM Example 67 is a system to implement of any of Examples 1-64.

PNUM Example 68 is a method to implement of any of Examples 1-64.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A node comprising:
   a memory including instructions; and
   processing circuitry that, when in operation, is configured by the instructions to:
   receive a data packet, the data packet including map data, a sequence of geographic areas to a requestor and a target geographic area, wherein the data packet was created in response to an interest packet originating from the requestor, and wherein the requestor is another network node;
   determine that the node is within the target geographic area;
   start a transmit timer based on a next-hop geographic area, the next-hop geographic area determined from the sequence of geographic areas in the data packet, wherein, to start the transmit timer based on a next-hop geographic area, the processing circuitry calculates a geographic component of time based on a proximity of the node to the next-hop geographic area, wherein the geographic component of time is smaller when the node is closer to the next-hop geographic area;
   count, during the transmit timer, a number of data packets received from the target geographic area that match to the data packet to determine that the number of data packets is less than a predefined threshold; and
   transmit a modified data packet in response to expiration of the transmit timer and the number of data packets is less than the predefined threshold, the modified data packet being the data packet modified such that:
   the map data is updated with map data from the node for the target geographic area; and
   the target geographic area is updated to the next-hop geographic area to specify a new target geographic area.

2. The node of claim 1, wherein the instructions configure the processing circuitry to update the map data from the node with the map data of the data packet.

3. The node of claim 1, wherein the interest packet specifies a request by the requestor.

4. The node of claim 3, wherein the data packet is one of two types, a first type including a response to the request, and a second type does not include a response to the request.

5. The node of claim 4, wherein the data packet is of the second type, and wherein the modified data packet includes an aggregation of map data from data packets of the second type received over a predefined period of time.

6. The node of claim 3, wherein the instructions configure the processing circuitry to:
   receive the interest packet, the interest packet including the sequence of geographic areas to the requestor;
   start a random timer;
   count, during the random timer, a number of interest packets received from the target geographic area that match the interest packet to determine that a number of interest packets is less than a second predefined threshold; and
   transmit a modified interest packet in response to expiration of the random timer and the number of interest packets is less that the second predefined threshold, the modified interest packet being the interest packet modified such that the target geographic area is added to the sequence of geographic areas back to the requestor.

7. The node of claim 1, wherein, to calculate the geographic component of time, the processing circuitry:
   determines a first vector from a center of the target geographic area to a center of the next-hop geographic area;
   determines a second vector from the center of the next-hop geographic area towards a center of a next-two-hop geographic area;
   adds the first vector and the second vector to produce a third vector;
   determines a fourth vector from the center of the target geographic area to the node;
   projects the fourth vector onto the third vector to produce a fifth vector; and
   sets the geographic component of time based on a magnitude of the fifth vector.

8. At least one non-transitory machine readable medium including instructions that, when executed by processing circuitry, cause the processing circuitry to perform operations comprising:
   receiving, at a node, a data packet, the data packet including map data, a sequence of geographic areas to a requestor, and a target geographic area, wherein the data packet was created in response to an interest packet originating from the requestor, and wherein the requestor is another network node;

determining that the node is within the target geographic area;
starting a transmit timer based on a next-hop geographic area, the next-hop geographic area determined from the sequence of geographic areas in the data packet, wherein starting the transmit timer based on a next-hop geographic area includes calculating a geographic component of time based on a proximity of the node to the next-hop geographic area, wherein the geographic component of time is smaller when the node is closer to the next-hop geographic area;
counting, during the transmit timer, a number of data packets received from the target geographic area that match to the data packet to determine that the number of data packets is less than a predefined threshold; and
transmitting a modified data packet in response to expiration of the transmit timer and the number of data packets is less than the predefined threshold, the modified data packet being the data packet modified such that:
the map data is updated with map data from the node for the target geographic area; and
the target geographic area is updated to the next-hop geographic area to specify a new target geographic area.

9. The at least one non-transitory machine readable medium of claim 8, wherein the operations comprise updating the map data from the node with the map data of the data packet.

10. The at least one non-transitory machine readable medium of claim 8, wherein the interest packet specifies a request by the requestor.

11. The at least one non-transitory machine readable medium of claim 10, wherein the data packet is one of two types, a first type including a response to the request, and a second type does not include a response to the request.

12. The at least one non-transitory machine readable medium of claim 11, wherein the data packet is of the second type, and wherein the modified data packet includes an aggregation of map data from data packets of the second type received over a predefined period of time.

13. The at least one non-transitory machine readable medium of claim 10, wherein the operations comprise:
receiving the interest packet, the interest packet including the sequence of geographic areas to the requestor;
starting a random timer;
counting, during the random timer, a number of interest packets received from the target geographic area that match the interest packet to determine that a number of interest packets is less than a second predefined threshold; and
transmitting a modified interest packet in response to expiration of the random timer and the number of interest packets is less that the second predefined threshold, the modified interest packet being the interest packet modified such that the target geographic area is added to the sequence of geographic areas back to the requestor.

14. The at least one non-transitory machine readable medium of claim 13, wherein the operations comprise updating map data of the node with the map data in the interest packet.

15. The at least one non-transitory machine readable medium of claim 8, wherein geographic areas have a predefined addressing.

16. The at least one non-transitory machine readable medium of claim 8, wherein an address is arranged in a grid in a two-dimensional plane, the address include a first identifier for a row and a second identifier for a column in the grid.

17. The at least one non-transitory machine readable medium of claim 16, wherein cells of the grid are sized based on a radio frequency environment for a cell.

18. The at least one non-transitory machine readable medium of claim 17, wherein the cells are sized such that a transmission from a first cell will reach an entirety of a neighbor cell.

19. The at least one non-transitory machine readable medium of claim 16, wherein the address includes a third indicator for a layer, the layer being another two dimensional at a different altitude.

20. The at least one non-transitory machine readable medium of claim 8, wherein calculating the geographic component of time includes:
determining a first vector from a center of the target geographic area to a center of the next-hop geographic area;
determining a second vector from the center of the next-hop geographic area towards a center of a next-two-hop geographic area;
adding the first vector and the second vector to produce a third vector;
determining a fourth vector from the center of the target geographic area to the node;
projecting the fourth vector onto the third vector to produce a fifth vector; and
setting the geographic component of time based on a magnitude of the fifth vector.

21. The at least one non-transitory machine readable medium of claim 20, wherein the second vector has a length equal to a distance between the center of the next-hop geographic area and the center of a next-two-hop geographic area reduced.

22. The at least one non-transitory machine readable medium of claim 8, wherein the transmit timer includes a random component combined with the geographic component.

23. A method comprising:
receiving, at a node, a data packet, the data packet including map data, a sequence of geographic areas to a requestor, and a target geographic area, wherein the data packet was created in response to an interest packet originating from the requestor, and wherein the requestor is another network node;
determining that the node is within the target geographic area;
starting a transmit timer based on a next-hop geographic area, the next-hop geographic area determined from the sequence of geographic areas in the data packet, wherein starting the transmit timer based on a next-hop geographic area includes calculating a geographic component of time based on a proximity of the node to the next-hop geographic area, wherein the geographic component of time is smaller when the node is closer to the next-hop geographic area;
counting, during the transmit timer, a number of data packets received from the target geographic area that match to the data packet to determine that the number of data packets is less than a predefined threshold; and
transmitting a modified data packet in response to expiration of the transmit timer and the number of data packets is less than the predefined threshold, the modified data packet being the data packet modified such that:

the map data is updated with map data from the node for the target geographic area; and the target geographic area is updated to the next-hop geographic area to specify a new target geographic area.

24. The method of claim 23, wherein an address is arranged in a grid in a two-dimensional plane, the address include a first identifier for a row and a second identifier for a column in the grid.

25. The method of claim 24, wherein the address includes a third indicator for a layer, the layer being another two dimensional at a different altitude.

26. The node of claim 1, wherein geographic areas have a predefined addressing.

27. The node of claim 1, wherein an address is arranged in a grid in a two-dimensional plane, the address include a first identifier for a row and a second identifier for a column in the grid.

28. The node of claim 27, wherein the address includes a third indicator for a layer, the layer being another two dimensional at a different altitude.

\* \* \* \* \*